US011392673B2

(12) United States Patent
Brown

(10) Patent No.: US 11,392,673 B2
(45) Date of Patent: Jul. 19, 2022

(54) SYSTEMS AND METHODS FOR OBFUSCATING WEB CONTENT

(71) Applicant: Cameron Brown, Colleyville, TX (US)

(72) Inventor: Cameron Brown, Colleyville, TX (US)

(*) Notice: Subject to any disclaimer, the term of this patent is extended or adjusted under 35 U.S.C. 154(b) by 0 days.

(21) Appl. No.: 16/942,587

(22) Filed: Jul. 29, 2020

(65) Prior Publication Data
US 2021/0034719 A1 Feb. 4, 2021

Related U.S. Application Data

(60) Provisional application No. 62/880,200, filed on Jul. 30, 2019.

(51) Int. Cl.
G06F 11/30 (2006.01)
G06F 21/14 (2013.01)
G06F 16/957 (2019.01)
G06F 16/958 (2019.01)
H04L 67/02 (2022.01)

(52) U.S. Cl.
CPC ............ G06F 21/14 (2013.01); G06F 16/958 (2019.01); G06F 16/9577 (2019.01); H04L 67/02 (2013.01)

(58) Field of Classification Search
CPC ............ G06F 21/6254; G06F 16/9577; G06F 16/958; G06F 21/14; H04L 67/2838; H04L 67/02
See application file for complete search history.

(56) References Cited

U.S. PATENT DOCUMENTS

| 8,739,243 | B1 | 5/2014 | Martini | |
|---|---|---|---|---|
| 9,634,993 | B2 | 4/2017 | Holloway et al. | |
| 2008/0167970 | A1* | 7/2008 | Nissim | G06Q 40/12 705/26.35 |
| 2008/0222736 | A1* | 9/2008 | Boodaei | G06F 21/14 726/27 |
| 2011/0167407 | A1* | 7/2011 | Betouin | G06F 21/14 717/120 |
| 2014/0281535 | A1* | 9/2014 | Kane | H04L 63/0428 713/168 |

(Continued)

FOREIGN PATENT DOCUMENTS

WO 2016066466 A1 5/2016

Primary Examiner — Cheikh T Ndiaye
(74) Attorney, Agent, or Firm — Sheppard Mullin Richter & Hampton LLP

(57) ABSTRACT

Systems and methods are disclosed herein for obfuscating sources of internet-based content for rendering a webpage. For example, a method for obfuscating sources of internet-based content for rendering a webpage is disclosed. The method includes retrieving, by an obfuscation server, internet-based data from at least one server hosting a webpage based on a request received from a web browser at an end user device, where the internet-based data comprises at least one source identifier indicative of a server hosting content for rendering the webpage. The method also includes obfuscating, by the obfuscation server, the at least one source identifier to generate obfuscated internet-based data and transmitting at least the obfuscated internet-based data to the web browser by the obfuscation server. The web browser renders the webpage based, in part, on the obfuscated internet-based data.

19 Claims, 13 Drawing Sheets

(56) References Cited

U.S. PATENT DOCUMENTS

| | | | |
|---|---|---|---|
| 2016/0132667 A1* | 5/2016 | Freitas Fortuna dos Santos | ........ H04L 9/14 713/189 |
| 2017/0169123 A1* | 6/2017 | Reshadi | ................ G06F 16/957 |
| 2017/0279782 A1 | 9/2017 | Martini | |
| 2019/0075344 A1 | 3/2019 | Brown | |

* cited by examiner

310

```
<html>
    <body>
        <image src="www.website.com/image1.jpg">     — 312
        </image>
                                                      — 314
        <image src="www.website.com/image2.jpg">
        </image>                                      — 315
        <image src="www.adserver.com/ad1.jpg">
        </image>                                      — 316
        <image src="www.adserver.com/ad2.png">
        </image>                                      — 318
        <image src="www.cdn.com/Banner.png">
        </image>
    </body>
</html>
```

GET List

| GET | www.website.com/image1.jpg | — 322 |
| GET | www.website.com/image2.jpg | — 324 |
| GET | www.adserver.com/ad1.jpg | — 325 |
| GET | www.adserver.com/ad2.png | — 326 |
| GET | www.cdn.com/Banner.png | — 328 |

```
<html>
    <body>
        <image src="www.website.com/ax49233.jpg">    — 512
        </image>
        <image src="www.website.com/bx33294.jpg">    — 514
        </image>
        <image src="www.website.com/39a5bc1.jpg">    — 515
        </image>
        <image src="www.website.com/1cb5a93.png">    — 516
        </image>
        <image src="www.website.com/442LXYZ.png">    — 518
        </image>
    </body>
</html>
```

Modified GET List

| | | |
|---|---|---|
| GET | www.website.com/ax49233.jpg | — 522 |
| GET | www.website.com/bx33294.jpg | — 524 |
| GET | www.website.com/39a5bc1.jpg | — 525 |
| GET | www.website.com/1cb5a93.png | — 526 |
| GET | www.website.com/442LXYZ.png | — 528 |

FIG. 5B

| Some in memory or server translation |
|---|
| ax49233.jpg → image1.jpg |
| bx33294.jpg → image2.jpg |
| 39a5bc1.jpg → ad1.jpg |
| 1cb5a93.png → ad2.png |
| 442LXYZ.png → Banner.png |

| Server GET List | |
|---|---|
| GET | www.website.com/image1.jpg |
| GET | www.website.com/image2.jpg |
| GET | www.adserver.com/ad1.jpg |
| GET | www.adserver.com/ad2.png |
| GET | www.cdn.com/Banner.png |

SYSTEMS AND METHODS FOR OBFUSCATING WEB CONTENT

CROSS-REFERENCES TO RELATED APPLICATIONS

This application claims the benefit of U.S. provisional patent application Ser. No. 62/880,200, filed Jul. 30, 2019 and entitled "Transparent Website Translation and Obfuscation for Servers and Cloud Servers," the disclosure of which is hereby incorporated by reference in its entirety.

TECHNICAL FIELD

Embodiments disclosed herein relate to the field of network services, and more specifically to systems and devices for obfuscating sources of web content.

BACKGROUND

The internet is the interconnection of many routers and switches put together with tie-ins to servers and cloud servers that connect and send data through this vast network for rendering of webpages on end user devices. The conventional way in which data, for rendering webpages, is received comes from many different servers and content delivery networks that host the data required.

When an end user device (generally executing a web browser) requests a webpage (e.g., a Uniform Resource Locator or URL) the server will conventionally serve a webpage source file. The source file is generally provided in HyperText markup language (HTML); however, the source file may be provided in any type of executable language. The source file includes a list of content in the form of links pointing to websites and directories in which web content for the webpage can be located. An example source page, where a user end device does not request a specific page of a website, is a default page or "index" page.

The source file leads the web browser on the end user device to create a list of web content to be retrieved to render the desired webpage at the end user device. This list is generally referred to as a GET list. The GET list contains all of the necessary web content to generate the webpage. The GET list may include, for example, style sheets, images, audio, video, text, and any other content.

The web content may be hosted on many different servers that each have their own Internet Protocol (IP) addresses. Conventional website generation systems allow the web browser of an end user device to locate each server over a network and download the necessary content as files that can be ingested by the web browser to render a webpage. Since the end user devices receive the IP address and the locations of each piece of web content, the end user devices can recognize the source of content and block certain content and/or ignore content from certain sources.

SUMMARY

Embodiments described herein provide for obfuscating web content with minimal impact on rendering and displaying of such content at end user devices. Various embodiments herein obfuscate data included in webpage source files for websites by altering source identifiers of web content.

Systems and methods are disclosed herein for obfuscating internet-based content for rendering a webpage. In one aspect, a method for obfuscating internet-based content for rendering a webpage is disclosed. The method includes retrieving, by an obfuscation server, internet-based data from at least one server hosting a webpage based on a request received from a web browser at an end user device, where the internet-based data comprises at least one source identifier indicative of a server hosting content for rendering the webpage. The method also includes obfuscating, by the obfuscation server, the at least one source identifier to generate obfuscated internet-based data and transmitting at least the obfuscated internet-based data to the web browser by the obfuscation server. The web browser renders the webpage based, in part, on the obfuscated internet-based data.

In one aspect, a system for obfuscating internet-based content for rendering a webpage is disclosed. The system comprises an obfuscation server; at least one memory configured to store instructions; and at least one processor communicatively coupled to the at least one memory. The at least one process is configured to execute the instructions to cause the obfuscation server to retrieve internet-based data from at least one server hosting a webpage based on a request received from a web browser at an end user device, where the internet-based data comprises at least one source identifier indicative of a server hosting content for rendering the webpage. The processor is also configured to obfuscate the at least one source identifier to generate obfuscated internet-based data and transmit at least the obfuscated internet-based data to the web browser by the obfuscation server. The web browser renders the webpage based, in part, on the obfuscated internet-based data.

In yet another aspect, an obfuscation server for obfuscating a webpage is disclosed. The obfuscation server comprises memory storing obfuscation and translation instructions and a processor coupled to the memory. The processor is configured to execute the instructions to receive a request from a web browser executed on an end user device for a webpage, the request based on an Internet Protocol (IP) addressed received from a Domain Name Service (DNS) server for a webpage hosted by a server and retrieve a source file of the webpage from the server based on the received request, source file comprising links to content for rendering the webpage. The processor is further configured to obfuscate, at least, the links of included in the source file and generate an obfuscated source file comprising the obfuscated links and transmit the obfuscated source file to the web browser.

In some embodiments, the processor is further configured to receive a GET list from the web browser comprising one or more obfuscated links; retrieve, from the server, content corresponding to the one or more of the obfuscated links included in the GET lists, the content comprising a filename and content data; obfuscate at least one of the filename and the content data of the retrieved content; and transmit the obfuscated content to the web browser. The web browser renders the webpage based, in part, on the obfuscated content as though the content was received directly from the server.

BRIEF DESCRIPTION OF THE FIGURES

The details of embodiments of the present disclosure, both as to their structure and operation, may be gleaned in part by study of the accompanying drawings, in which like reference numerals refer to like parts, and in which:

FIGS. 3A and 3B illustrate example internet-based data retrieved using the system of FIG. 1.

FIGS. 5A-5D illustrate example internet-based data exchanged in the obfuscation and translation system of FIGS. 4A and 4B.

DETAILED DESCRIPTION

Figure 1:
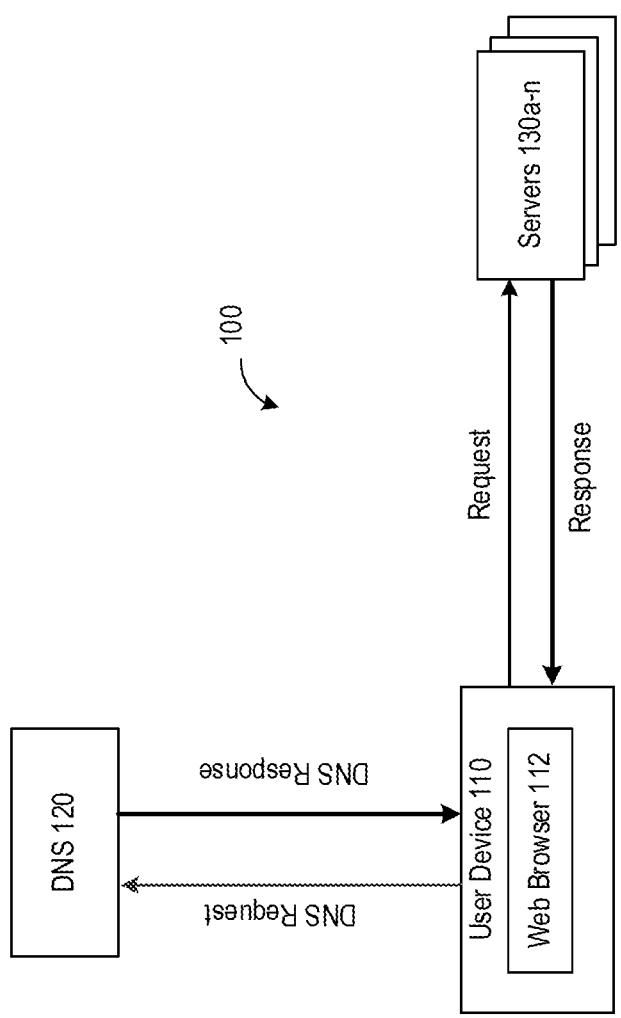
FIG. 1 illustrates an example system architecture for accessing a website.

The detailed description set forth below, in connection with the accompanying drawings, is intended as a description of various embodiments and is not intended to represent the only embodiments in which the disclosure may be practiced. The detailed description includes specific details for the purpose of providing a thorough understanding of the embodiments. However, it will be apparent that those skilled in the art will be able to understand the disclosure without these specific details. In some instances, well-known structures and components are shown in simplified form for brevity of description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with one embodiment, it is understood that it is within the knowledge of one skilled in the art to effect such feature, structure, or characteristic in connection with other embodiments disclosed herein whether or not explicitly described.

In an example implementation, a method for obfuscating internet-based content for rendering webpage includes using an obfuscation server to retrieve internet-based data from at least one server that is hosting a webpage based on a request received from an end user device to access the webpage. The internet-based data comprises at least source identifiers of a server hosting content for rendering the webpage. The obfuscation server obfuscates the source identifiers of one or more pieces of the content and generates obfuscated internet-based data. The obfuscation server then transmits the obfuscated internet-based data to the end user device. The user may then access the webpage via the web browser configured to render content based in part on the received obfuscated internet data.

In some embodiments, the obfuscation server may retrieve a source file for a webpage from server(s) hosting the webpage. The obfuscation server then obfuscates the links and other source identifiers of content included in the source file and generates an obfuscated source file. The obfuscation server then transmits the obfuscated source file to the end user device. The user may then access the webpage via the web browser configured to render content based in part on the received obfuscated source file. Additionally, in some embodiments, the obfuscation server may receive a request for content from the web browser, the request including obfuscated source identifiers. The obfuscation server may then translate the obfuscated source identifiers to original (e.g., un-obfuscated) source identifiers and retrieve the content from the web servers hosting the content. The obfuscation server may then obfuscate the filename, other source identifier, and/or content data of the retrieved content and transmit the obfuscated content to the end user device. In various embodiments, representation of the content on a display of the end user device (e.g., the appearance to the user upon rendering the content) is unaltered from the un-obfuscated content because the obfuscation server does not obfuscate the underlying content data to is ingested by the web browser to render the content. Only the filename and source identifiers are obfuscated.

In some embodiments, source identifiers for all content for the webpage is obfuscated. In another embodiment, a whitelist may be provided that identifies (e.g., tags or marks) some of the content that is not to be obfuscated, that is the obfuscation server ignores source identifiers of the content indicated in the whitelist while obfuscating the other source identifiers. In this embodiment, the obfuscation server may then transmit the obfuscated internet-based data and un-obfuscated internet-based data to the end user device. Thus, embodiments herein provide for obfuscating content sources for an entire website, unless otherwise specified.

In various embodiments, content is hosted on a plurality of servers and the obfuscation server may be configured to obfuscate source identifiers the content to appear to be hosted by one server. For example, where a first piece of content is hosted on a first server and a second piece of content is hosted on a second server, the obfuscation server may alter the source identifier of the first content to correspond to the second server. However, the first server continues to host the first content.

As used herein, obfuscate is used to refer to rendering something obscure, or confusing to receiving devices. Embodiments herein obfuscate internet-based data to render the source of web content obscure or confusing to receiving device. For example, source identifiers may be randomized, scrambled, encrypted, or the like. The obfuscation server may be implemented as a randomizer or scrambler device configured generate a random value (e.g., character string). The obfuscation server then replaces the original value with the randomized value and stores the randomized value in a storage device with the original value for later retrieval. In another example, the original value of the source identifier may be encrypted using an encryption algorithm (e.g., hash algorithm such as MD5, SHA, RIPEMD-160, Whirlpool, SHA, CRC32 etc. and any cryptography algorithms known in the art) and the decryption key or certificate is stored in a storage device for deriving the original values. Any obfuscation algorithm may be implemented such that the obfuscated values (e.g., randomized, encrypted, etc.) obscure the original values and are not recognizably related to the original values.

As used herein, website refers to a collection of webpages sequentially accessed and rendered on by web browser based on navigation inputs received from the user (e.g., touch interactions, gestures, keystrokes, etc. into an end user device). As used herein, internet-based data refers to any data file and/or file type that is packaged and communicated over the Internet, such as files, objects, and web content (also referred to as content) hosted by servers for use in rendering websites on end user devices. In various embodiments described herein, internet-based data may refer to a source file of a webpage that comprises a list of web content for rendering the webpage. An example source file is an index page or a default page provide by a server in response to a request to access a website, where the request does not request a specific webpage of the website. The index page may by an index.htm file containing a static or configurable list of objects and links for web content.

The source file is may be provided in any executable code language that is ingestible by a web browser executed as at end user device. For example, web page source files are conventionally provided in HTML format; however, the source file may be provided in any type of executable language. The source file includes a list of web content that may be provided as objects and links pointing to the location of the web content. Web content as used herein refers to any content elements (such as HTML elements) that can be ingested by a web browser to render a webpage. Web content may include, but is not limited to, webpages (e.g., in HTML) of the requested website and/or other websites, style sheets, image content, audio content, video content, word processing or textual content, PDF content, iframes (e.g., embedded frames or any HTML document embedded inside another HTML document), JavaScript, objects, any computer files, and any other HTML elements.

As used herein, the term server may refer to any computing device and/or software configured to provide functionality for other programs or devices (e.g., clients). Clients may be other servers, devices, end user devices, etc. In various embodiments, the servers described herein are implemented by a request-response model whereby a client (e.g., another server, device or end user) rends a request and the server performs some action and sends a response to the client. Servers described herein may be application servers, communications servers, computing servers, proxy servers, virtual severs, web servers, and/or any type of server as known in the art. Additionally, the term server as used herein may refer to a cloud server, which may be a virtual server or servers running in a cloud computing environment.

Embodiments disclosed herein provide for securing internet-based data by minimizing outside attacks on servers hosting internet-based data, for example, by maintaining servers behind an obfuscation server. Thus, the servers themselves are hidden. In some embodiments, the servers hosting content may not have an IP address accessible outside a local, internal network, thus having only an internal address to that it responds to. In this way, the server may never accessible outside of local, internal network and protected from external attacks.

FIG. 1 illustrates an example system architecture 100 for providing web content to end user devices for rendering webpages. The system 100 includes an end user device 110 configured to communicate with Domain Name System (DNS) 120 and one or more servers 130a-n via a network.

Figure 12:
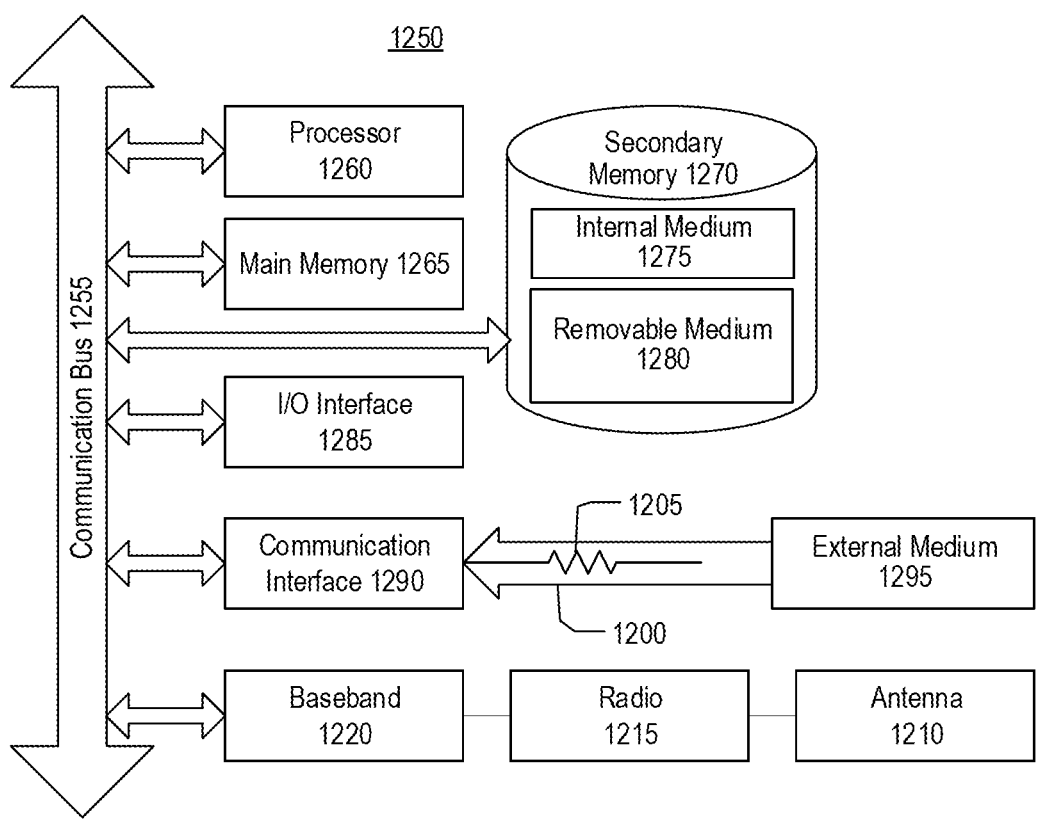
FIG. 12 is a functional block diagram of a computing device in accordance with the embodiments disclosed herein.

Usage of the terms computer, system, server, processing device, and end user device are intended to include any data processing device, such as a desktop computer, a laptop computer, a tablet computer, a mainframe computer, a handheld device, an embedded processor, or any other device able to process data, such as the example computing device 1200 of FIG. 12. The computers, systems, servers, and/or end user devices described herein are configured to include one or more processors communicatively connected to one or more non-transitory computer-readable media storing instructions for performing the functions disclosed herein and one or more networks.

The DNS 120 may refer to a DNS as a whole and may include one more DNS servers (e.g., preferred domain servers, top-level domain name servers, other domain servers) configured to resolve DNS requests from users of the network. For example, an end user device 110 may communicate a DNS request comprising a URL or webpage address that the DNS 120 resolves to an IP address for a server 130 hosting the requested webpage, as described below in more detail. Each DNS server of the DNS 120 may be implemented as, for example, the computing device 1200 of FIG. 12.

The servers 130a-n are computing devices (e.g., the example computing device 1200 of FIG. 12) that serve web content, for example, by hosting one or more websites made up of one or more webpages and/or web services. The servers 130a-n respond to requests (e.g., from an HTTP request, FTP request, telnet request, etc.) for web content. Servers 130a-n host web content necessary for rendering webpages of the hosted website on a web browser executed on end user devices (e.g., web browser 112). Although not illustrated in FIG. 1, it should be understood that the web content of the servers 130a-n may be stored separately from the device that responds to the requests, for example in a cloud instance. Thus, each web-server 103 may be implemented as a cloud server or virtual server.

The end user device 110 is computing devices capable of accessing the network to retrieve web content that the end user device 110 may use to render webpages on a display. End user device 110 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, point-of-sale terminals, Automated Teller Machines, and the like.

The end user device 110 may comprise a client network application 112 such as a web browser or other application (e.g., FTP client, SSH client, Telnet client, etc.) (referred to herein simply as web browser 112) installed thereon. The web browser (e.g., Firefox®, Internet Explorer®, Chrome®, etc.) is configured to access the Internet via the network, request web content in executable source code from servers, parse the executable source code of webpages (e.g., via an HTML parser), and render the webpage for display to the user. While a single end user device 110 is described herein, it will be understood that the embodiments described herein and throughput the present application will apply equally to any number of end user devices. As such, any number of end user devices 110 may be in communication with the DNS 120 and/or servers 130.

Communications to/from the DNS 120, end user device 110, and/or servers 130 are transmitted over a wired or wireless network. The network may comprise the Internet, and end user device 110 may communicate with the DNS 120 and servers 130 through the Internet using standard transmission protocols, such as HyperText Transfer Protocol (HTTP), Secure HTTP (HTTPS), File Transfer Protocol (FTP), FTP Secure (FTPS), SSH FTP (SFTP), and the like, as well as proprietary protocols.

Figure 2A:
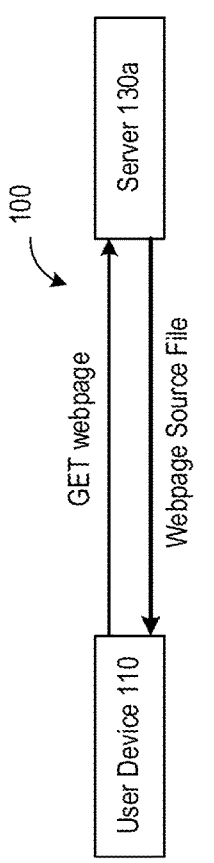
FIGS. 2A-2D schematically illustrate accessing a website using the system of FIG. 1.
Figure 2C:
Figure 2B:
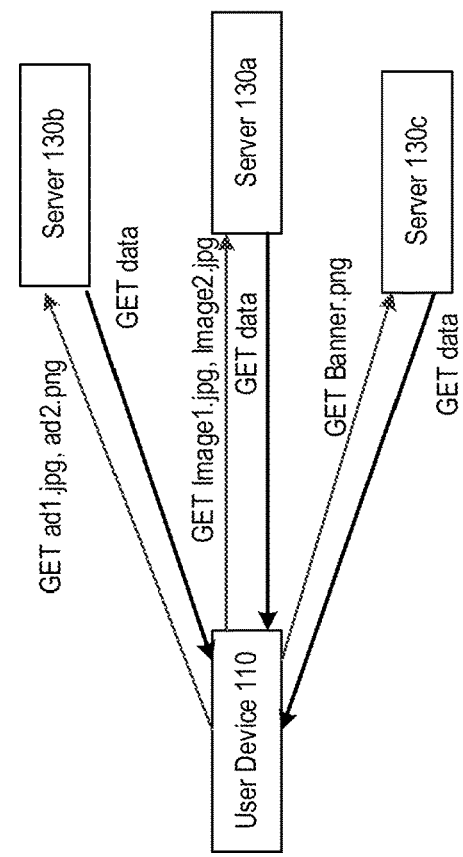

FIGS. 2A-2B schematically illustrate system 100 used by an end user device 110 to retrieve web content to access a webpage. The flow for retrieving such content can follow a back and forth messaging method in order to exchange information through, for example, Transport Control Protocol (TCP) or User Diagram Protocol (UDP). Hypertext Transport Protocol (HTTP) is an example protocol for transferring HTML and other web content across a network send over TCP and/or UDP. The exchanged messages may be in the form of data packets or packets (e.g., containers of information that contain the actual information needed such as headers, instructions and payload). Packets may be HTTP encoded packets, which allows both the end user device 110 and other devices on the network to talk to each other and execute transactions.

While reference herein is made to the end user device 110 sending/receiving communications the DNS system 120 and/or servers 130, it will be appreciated that the web browser 112 of the end user device 110 may be initiating the communications which are then transmitted by, for example, communication interface of the end user device 110 over the network to the receiving component (e.g., communication interface 1290 of FIG. 12). Therefore, reference to the end user device sending/receiving communications is intended to not be limited to only the end user device, but is to encompass such interactions between the web browser 112 and the DNS system 120 and web browser 130. That is a communication from end user device 110 may be been include the web browser 112 initiating a communication to the internal components of the end user device 110 which is transmitted by the end user device to other components via the network.

As shown in FIG. 2A, end user device 110 communicates a request to a DNS 120 to access a webpage via web browser 112, for example, www.website.com. The webpage www.website.com may be illustrative of an index page as the address is for the home page of the website; however, the embodiments described herein apply equally to a home page or any webpage (e.g., www.website.com/page2, for example). If IP address for the server hosting the webpage is not stored at the client device 110 (e.g., a cache on the client device 110 does not have an entry for www.website.com or the entry has expired), the client device makes a DNS request to the DNS 120 for the IP address for www.website.com. The DNS request may include a webpage domain name entered into web browser 112 by the user of the end user device 110 and a database on the DNS 120 contains IP addresses of servers. The DNS 120 resolves the domain name into the IP address of the server of the requested webpage and communicates a DNS response include the IP address. In some embodiments, the DNS system 120 may direct the end user device 110 to a load balancer (not shown) configured to balance the network traffic, that is to even out the load, by sending the end user device to a different server that may be geographically closer to the end user device 110 and/or that has a lower load (e.g., lower number of users) than the main server or other servers that will have the content that will be needed to translate and create a webpage or other content the user has been requested by the end user device 110.

For example, the end user device 110 performs a DNS request to DNS system 120 for www.website.com. The DNS system 120 responds with a DNS response to the end user device 110 that includes the IP address for server 130a that hosts the webpage and contains the information for accessing www.website.com. An example IP address may be, for example 5.5.5.5 that indicates the web content for the webpage is hosted by server 130a located at 5.5.5.5.

At FIG. 2B, the end user device 110 transmits a request to the location (e.g., IP address) indicated in the DNS response for access to www.website.com. The request from the end user device 110 may include a GET request that is generated by the web browser 112 requesting web content for rendering the webpage. The server 130a responds with a message containing a source file including a list of web content for rendering the webpage. For each piece of web content, the source file includes a source identifier, such as a pathway or path to the web content. In some embodiments, the source identifiers are links (e.g., hyperlinks) pointing to locations of where (e.g., servers) the web content is stored and/or hosted. The source identifier may also include filename, for example, as part of the pathway. In various embodiments, the source file may be in the form of an HTML file (sometimes referred to as an index.html or a similarly default page as known by one skilled in the art) that is transmitted back to the end user device 110. An example source file is shown in FIG. 3A which illustrates source file 310 illustratively shown as an index.html file (however any source file may be used) including executable HTML code including source identifiers 312-318 (referred to herein as paths 312-318) to web content illustratively shown as links (including URLs) that point to a location of the respective web content. The location may be a server hosting the web content and/or a database (or other storage device) where the web content is stored. Accordingly, the paths 312-318 indicate the source (e.g., the server 130) hosting the web content (e.g., www.website.com for path 312) and the web content represented as a data file (or also referred to herein as an object) having a label (or filename) (e.g., image1 for path 312) and a file type (e.g., an extension) (e.g., .jpg for path 312).

In various embodiments, the source file may include web content and paths for retrieving all the web content of a webpage. That is, the source file may include paths to web content for rendering each webpage of the webpage. Thus, the web browser 112 may utilize the source file to request web content for a given webpage based on user inputs into the end user device 110 navigating about the webpage. Thus, the source file 310 shown in FIG. 3A is an example source file that has been simplified for illustrative purposes only. An actual source file may be significantly larger and more complex. The source file may be created by the owner of webpage to set forth the web content properly displaying the webpage as designed and desired by the owner.

Upon receiving the source file at the end user device 110, the browser 112 of the end user device 110 creates a GET list based on the paths 312-318 to web content contained in the source file for rendering the requested webpage. Similarly, each time the user navigates to a different webpage of the website, the process repeats such that the web browser requests a source file for a different webpage and may generate a corresponding GET list for that webpage. FIG. 3B illustrates a graphical representation of an example GET list 320 created from the elements of source file 310, for example, for the requested webpage (in this example, a default page or index page). The GET list 320 may be a list of GET requests for pieces of web content, each containing a path 322-328 for each for piece of web content. The GET list include the paths 322-328 based on extracting the paths 312-318 from the source file and packaging the extracted paths into a corresponding GET request of the GET list. The browser 112 uses the GET list 320 to request web content from the servers 130.

The web browser 112 may determine which piece of web content in the source file 310 based on rules for rendering the webpages programmed into the web browser 112 (e.g. the browser engine). In some embodiments, the rules may be affected by addons (e.g., add-on programs installed into the browser 112 running within the browser) and/or blocking programs that are configured to change the rendering on of the webpage in anyway. For example, addons may block certain web content from downloaded by the web browser 112; block certain webpages from communicating with the web browser 112; and/or instructing the web browser 112 to ignore requests from certain webpages. An example of such an add on is NoScript® (https://noscript.net) that allows users to block almost anything on a webpage and instructs the web browser as to what servers to not talk to or accept information from. This may cause a webpage not to work correctly, but it allows a user to circumvent paths in the source file that cause the web browser to retrieve web content for the webpage as created by the owner of the webpage (e.g., advertisements or other information). Various examples of addons and blocking programs may utilize the paths in the index file to recognize a source of a web content (e.g., that it an advertisement) and determine to block this content or instruct the web browser 112 to ignore this content.

FIG. 3B depicts a GET list 310 that an end user device 110 would generate upon visiting a webpage assuming that no addons or blocking programs are running that alter the content retrieved by the web browser 112. In this example, the GET list 320 retrieves Image1.jpg and Image2.jpg from server 130a hosting www.website.com. The request for those files goes straight to server 130a, as the location of the server 130a is locally cached on the end user device 130a from the prior DNS response from the DNS 120.

The GET list 320 also indicates that there are three other pieces of content to retrieve that are not located at www.website.com but are needed to render the webpage correctly (e.g., ADimage1.jpg, ADimage2.jpg, and Banner.png). The web content may be located on other servers (e.g., server 130b and/or 130c). Thus, the end user device 110 via the web browser communicate new DNS requests to lookup the IP addresses for www.adserver.com and www.cdnserver.com. If an addon or blocking program is running, then the GET list may be different in that one or more pieces of content may not be included in the GET list. For example, one or more of ADimage1.jpg, ADimage2.jpg, and/or Banner.png may be blocked.

All servers 130a-b may correspond to an IP address stored in a database of the DNS 120. The web browser 112 may query the DNS 120 when the source file is received in order to find which servers 130 are hosting desired web content and where the servers are located among the other IP addresses that are assigned to other servers. As an example, www.website.com may have resolved to 5.5.5.5 for server 130a, www.adserver.com resolved to 4.4.4.4 for server 130b, and www.cdnserver.com resolved to 3.3.3.3 for server 130c. The web browser 112 may then compile a GET list based on the source file that was received from www.website.com and resolve the addresses of the servers 130 to retrieve all web content that the webpage requires in order to render correctly from the various servers 130a-n.

For example, as shown in FIG. 2C, the end user device 110 issues additional DNS requests to the DNS system 120 for the IP addresses for server 130b (e.g., the server hosting www.adserver.com) and server 130c (e.g., server hosting www.cdnserver.com). The DNS system 120 returns one or more DNS responses including the location of server 130b (e.g., IP address 4.4.4.4) and server 130c (e.g., IP address 3.3.3.3).

Figure 2D:
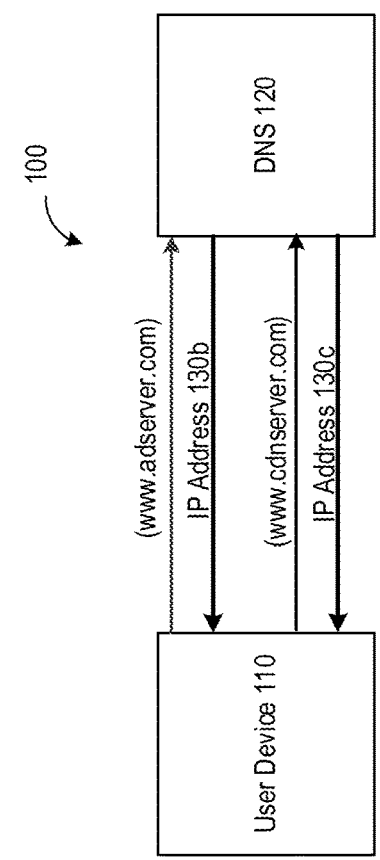

Turning to FIG. 2D, once the end user device 110 receives the IP addresses for the web server hosting the web content of the GET list 320, the web browser requests all of the web content included on the GET list based on cached IP addresses from the DNS responses. The web content may be retrieved as internet-based data files for each web content, each web content file comprising a file name (or label), a file type (e.g., a file extension), and data for the web content that the web browser can ingest to render the webpage and display on the end user device 110. For example, the internet-based data file for a piece of web content may be an HTML element. FIG. 2D illustrates the end user device 110 communicating a request to server 130b at its IP address to retrieve ADimage1.jpg and ADimage2.jpg and receiving a response back with the requested data. Similarly, the web browser communicates a request to server 130c at its IP address to retrieve Banner.png and then receives the requested data as a response from server 130c including Banner.png. In a similar fashion, Image1.jpg and Image2.jpg are received from server 130a. The various requests to the servers shown in FIG. 2D may be made simultaneously or one after the other. The order of the requests may be any order such that the requested data is received. At this point, the web browser 112 has downloaded everything that was on the GET list and is able to render the webpage using the content were retrieved from all the different servers. In some examples, there can be more requests for style sheets (a file that holds data on how a webpage should look), JavaScript libraries, and other types of material; but for the purpose of showing a simple example some things have been omitted.

The above example described in connection to FIGS. 2A-2D is provided in the context of a GET request. However, the process described above also applies to a POST request, where the end user device 110 requests a location of a webpage from DNS 120 and transmits a POST request to change some element of the webpage and/or store some information at the location. That is, a source file is provided to the end user device 110 as described above and the end user device 110 then sends the POST request based on the received source file.

Figure 4A:
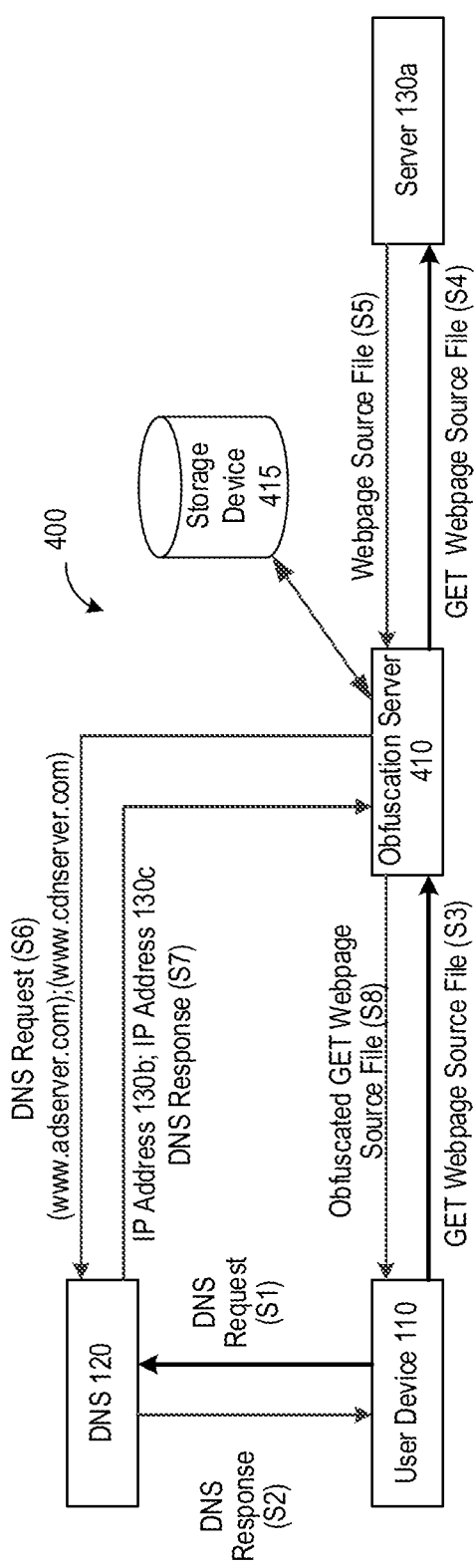
FIGS. 4A and 4B schematically illustrate a graphical representation of an example obfuscation and translation system in accordance with embodiments disclosed herein.
Figure 4B:
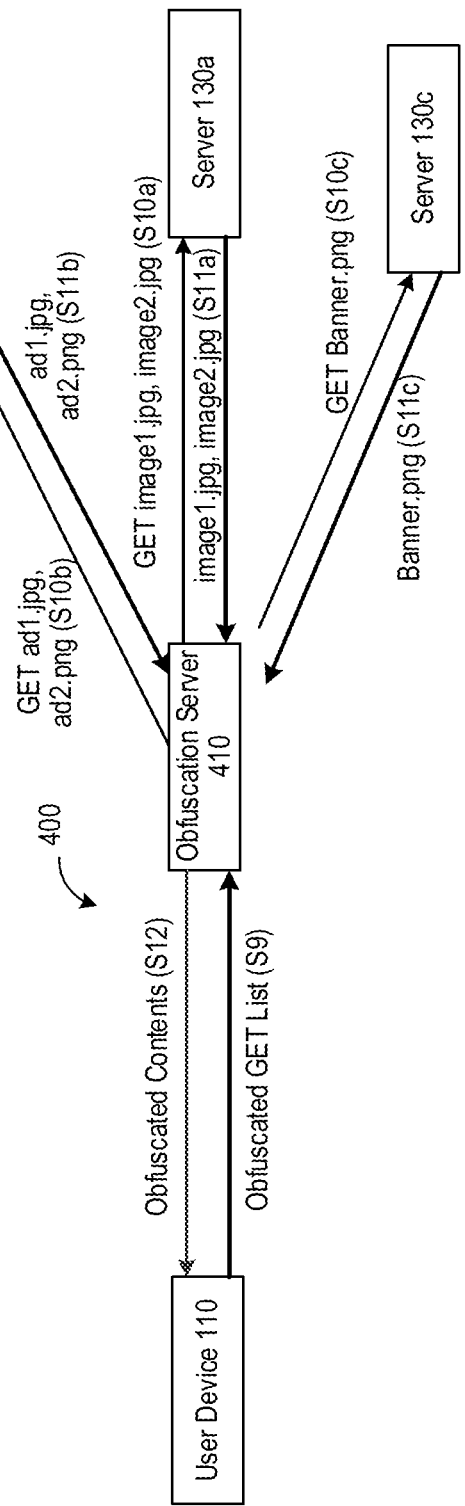

Embodiments disclosed herein incorporate an obfuscation server into the process flow described in connection to FIGS. 2A-2D to hide the source of web content without changing the end users experience. For example, FIGS. 4A and 4B illustrate an example obfuscation and translation system 400 (referred to herein simply as the obfuscation system or system 400) according to embodiments disclosed herein. The system 400 may be similar to that of system 100, in that system 400 includes an end user device 110 configured to communicate with DNS 120 and one or more servers 130a-n via a network (not shown) for rendering a requested webpage. The system 400 also includes an obfuscation server 410 that receives requests from the end user device 110, forwards the requests to the servers 130a-n, receives responses from servers 130a-n, and forwards the requests to the end user device 110.

In various embodiments, the obfuscation server 410 is configured to obfuscate internet-based data included in responses from the servers 130a-n. As described above, internet-based data may refer to any data packaged in a response from a server 130 for rendering a webpage, for example, based on requests from an end user device 110. For example, internet-based data may include elements included in the source file (e.g., source identifiers 312-328); data files or objects of web content, file names of web content, and/or any data contained within the responses from servers. The obfuscation server 410 in the embodiments herein is configured to obfuscate or hide the source of web content, without altering the web content itself and/or how the content is rendered or displayed at the end user device. For example, the file name and/or source identifier for web content, as described below, is obfuscated such that the web browser 112 cannot directly correlate what the obfuscated source of the web content with the original source that content may have come from. In various embodiments, since the actual data of the file for the web content is unaltered, the web content is able to be ingested and rendered by the web browser 112, thereby displaying the web content in an unaltered manner to the user. In other embodiments, the actual content data may be altered in a superfluous way that does not alter the manner in which the web content is displayed, but alters the characteristics or properties of the content file. This superfluous alteration may serve to further hide what the web content is without affecting how the web browser ingests the content.

For example, embodiments disclose herein provide methods and systems for rendering webpages of a website while hiding the source of web content of the webpage. For example, the obfuscation server 410 receives a request from a web browser 112 for a source file for accessing a webpage. The obfuscation server 410 retrieves the source file 310 from the server 130a based on the received request, the source file including pathways 312-318 to web content for rendering the webpage. The obfuscation server 410 then generates an obfuscated source file by obfuscating the pathways of the source file and transmits the obfuscated source file to the end user device 110 (e.g., web browser 112 at the end user device 110).

When the end user device needs to render a webpage, the end user device 110 generates a GET list from the received obfuscated source file. The obfuscation server 410 receives the GET list from the end user device 110 comprising one or more of the obfuscated pathways from the obfuscated source file. Since the GET list was generated using the obfuscated source file, this GET list is referred to herein as an obfuscated GET list.

The obfuscation server 410 then retrieves, from the server 130a, content corresponding to the obfuscated pathways included in the obfuscated GET list 520. For example, the obfuscation server 410 translates the obfuscated pathways to original pathways 312-328 and transmits its own GET list to the server 130a and retrieves the web content. As used herein, original pathways may also be referred to as unobfuscated. However, in some embodiments, the original pathways 312-328 may have been obfuscated by a previous obfuscation process. For example, a second obfuscation server (similar to obfuscation server 410) may have obfuscated the source file in accordance with embodiments herein, which is provided to the obfuscation server for a subsequent obfuscation process. This may server to further hid the source of content as provided throughout the disclosure.

The obfuscation server 410 obfuscates the retrieved web content and transmits the obfuscated web content to the end user device 110 for rendering by the web browser 112. For example, the obfuscation server 410 obfuscates the filename of the web content, without altering the underlying data object. The web browser 112 can then render the webpage based, in part, on the obfuscated web content as though the web content were received directly from the server 130a. For example, since the underlying web content is not altered (only the source identifiers) the HTML parser of a web browser 112 is able to ingest and generating the webpage as designed by the owner.

In some embodiments, the obfuscation server 410 may obfuscate sources of an entire webpage, for example, by altering the source identifiers of all elements that make up the webpage unless otherwise specified (e.g., specified in a whitelist as described below). This includes web content such as, but not limited to, images, videos, audio, text, embedded frames, style sheets, iframes and any other HTML elements such that the source of all content is obscure from the user. This also may include, but is not limited to, names and IDs to make sure no function, form, other HTML elements, other identifiers (e.g., identifiers for any special browsers or ones that don't follow the normal HTML or other standards, or that are a part of a programming language (e.g. python, php) but not a part of the specific HTML format)) is never the same for any two end user devices and so cannot be tracked back to a certain server. All elements that are obfuscated may be required to conform to HTML standards or other standards as known to one skilled in the art. Thus, form, box, textbox, other HTML standard understood names and invocations may not be changed, as well as any programming language specific names, elements, or invocations that are required for the webpage to render correctly and for the end server to understand.

The obfuscation server 410 is configured to "transparently" obfuscate internet-based data from servers 130 to render the source of web content obscure or confusing. The end user is unable to determine what was obfuscated and how it was obfuscated, because to the end user device 110 the received web content conforms with that requested in the GET list. In various embodiments, from the view point of the end user device 110, the user would experience no indication of changes in the rendering of the requested webpage and the end user device 110, because the web browser 112 operates as though nothing has changed from the process described above in FIGS. 2A-2D. The only perceptible change may be that the source of web content is unclear, for example, when an html source page of the webpage is viewed on a display of the end user device 110, source identifiers, labels or file names for web content would be viewable as, for example, obfuscated values. In some embodiments, were a web browser 112 includes addons, or block programs, an indication that something is out of place be that the addons or blockers are not working as expected (e.g., web content or webpages that should have been blocked is being rendered by the web browser).

The obfuscation server 410 may be configured to translate or remap obfuscated values back to original values. For example, when the obfuscating an original value of web content, a corresponding translation key is generated and stored in association with an original value. The translation key and original values may be stored in a storage device 415, such as a cache (e.g., a web cache, memcache, etc.), a database, or cloud storage. In some embodiments, the translation key may be the obfuscated value stored in association with the original value. Thus, upon receiving the obfuscated value from the end user device 110 (e.g., as part of an obfuscated GET list) the obfuscation server 410 can retrieve the original value for inclusion in a GET list to the web serve 130a. In another example, where obfuscation comprises encryption, the translation key may be a decryption key used to derive the original value from the obfuscated value.

The obfuscation server 410 is communicatively coupled to a storage device 415. For example, the storage device 415 may be configured to store original values, translation keys, associations between the original values and translations keys, IP address of servers 130, client information, cached web content, etc. The storage device 415 may be any type of memory and/or database and may be one or more of the same or different types of storage devices. The obfuscation server 410 may submit data via POST requests to be stored in storage device 415 and/or request data via GET requests stored in storage device 415. Any suitable storage medium may be utilized, including without limitation MySQL™ Oracle™, IBM™, Microsoft SQL™, Sybase™, Access™, and the like, including cloud-based database instances and proprietary databases. In some embodiments, the storage device 415 may comprise a memcached, which is an in-memory caching program that creates a service that runs in memory and saves data in memory for retrieving later from memory. Data is saved directly to memory without changing the disk storage (e.g., HDD, SSD, MMC, eMMC, Flash memory). Thus, no space is taken up on the storage device, only in the computers' random-access memory (RAM). Such storages devices may server to speed up processing because RAM is generally faster than other storage mediums and may also be less prone to errors (particularly, if using ECC (Error-correcting code) memory like server memory). Furthermore, embodiments herein can implement any memory scheme that can save data to memory and allow quick retrieval when needed to render resources for a webpage by storing the links and pointers in RAM cache instead of on the disk like a database would normally do.

In various embodiments, the obfuscation server 410 can be a stand-alone device(s) or integrated into a router or smart switch. The obfuscation server 410 may be implemented as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. Thus, while the description here in refers to the obfuscation server 410 as a serve, the obfuscation server may be implemented as any computing device (e.g., the computing device 1200 of FIG. 12) having at least a processor communicatively coupled (e.g., wired or wirelessly) to a memory storing a software in the form instructions that, when executed by the processor perform the functions described herein as being performed by the obfuscation server 410.

Thus, while reference here is to an obfuscation server, one skilled in the art will appreciate that the obfuscation server may be any device. That is obfuscation and translation described herein only requires a computing device executing a program to translate and obfuscate internet-based data as described herein. In some embodiments the obfuscation server 410 may comprise multiple servers where one or more perform obfuscation functions (such server(s) may be obfuscation servers) and one or more servers perform translation functions (such server(s) may be obfuscation servers). Furthermore, the obfuscation server 410 may be configured to do the translating and obfuscating of the elements and transmit a report to a main server or device which collects and stores lists of correspondence between original values and obfuscated values for use when a certain webpage or web content is requested.

Obfuscation of the source of web content may advantageously reduce the likelihood of blocking or otherwise avoiding certain web content (e.g., ad related resources or other resources not directly related to the user's desired content), and may make it very difficult or almost impossible to block or otherwise avoid the obfuscated content. For example, certain methods of blocking or avoiding such content may rely on recognizing a label, name, and/or source of content. Thus, if such is obfuscated, it will be difficult to recognize and thus avoid the content.

FIGS. 4A and 4B illustrate a flow for obfuscating the source of web content without altering the user experience at the end user device 110. Similar to FIG. 1, the end user device 110 sends a DNS request to DNS 120 (S1) to access a webpage and receives an IP address in response thereto (S2). The DNS response (S2) may include an IP address for the obfuscation server 410, instead of the server 130a hosting the requested webpage. The DNS 120 may have resolved the request to point to the obfuscation server based on an indication in the DNS 120 that the owner of webpage (or server 120a) subscribed to, purchased, and/or an agreement to utilize the services provided by the obfuscation server 410. The indication therefor instructs the DNS 120 to point end user devices requesting access to the webpage to the obfuscation server 410.

The end user device 110 then sends a GET request (3) for the webpage to retrieve the source file from the IP address received in the DNS response. Unlike in FIG. 2B, the GET request is received by the obfuscation server 410 (S3). The end user device 110 is unaware that the GET request has been received by the obfuscation server 410 and not the server 130a, because the end user device 110 operates under conventional methods by sending a GET response to the IP address provided by the DNS 120. That is, throughout the communications in FIGS. 4A and 4B, the end user device 110 operates as though it is communicating with the server as in FIGS. 2A-2D.

The obfuscation server 410 then forwards the request to the server 130a that is hosting the desired webpage (S4). The obfuscation server 410 may store the IP address of the server 130a in a storage device 415 based on the subscription or agreement for services between the obfuscation server 310 and the server 130a. Thus, when the obfuscation server 410 receives a GET request from an end user device 110 for a given webpage, the obfuscation server 410 resolves the request, looks up the IP address for the server 130a (e.g., stored in storage device 415) and sends a GET request to the server 130a. The GET request may include a request for the source file of the webpage requested by the end user device 110 (e.g., source file 310 of FIG. 3A). The server 130a responds in a manner similar that described in FIG. 2B, for example, by sending the source file to the obfuscation server 410.

Once received at the obfuscation server 410 (S5), elements included in the source file can be obfuscated to generate an obfuscated source file. For example, the obfuscation server 410 may receive a source file such as that illustrated in FIG. 3A. In some embodiments, the obfuscation server 410 may use the source file 310 to retrieve IP address for web content hosted by other servers (e.g., servers 130b and 130c) via a DNS request/response (S6 and S7) with DNS 120 (e.g., similar to that shown in FIG. 2C) and may obfuscate paths 312-318 (e.g., source identifiers) for web content into new, obscure values for each web content. Using the new, obscure values, the obfuscation server 410 generates an obfuscated source file 510 as shown in FIG. 5A and transmits the obfuscated source file to the end user device 110 (S8). In some embodiments, the obfuscated source file 510 may be generated prior to retrieving the IP address for web content hosted by the other servers (e.g., S6 and S7 may be performed after S8 or later).

In various embodiments, the obfuscating the paths 312-318 includes ingesting the source file 310 by the obfuscation server 410, extracting the source identifiers for each web content, and obfuscating the source identifiers. The obfuscated source file 510 is then created using the obfuscated source identifiers. In the illustrative example shown in FIG. 5A, the obfuscation server 410 obfuscated the filename of web content in paths 312 and 314. In some embodiments, alone or in combination, the source identifiers of web content can be obfuscated such that the content appears to be hosted by the same server. For example, as shown in FIG. 5A, the obfuscation server 410 obfuscated the filenames of the web content and source server for paths 515-518 (e.g., www.adserver.com was changed to www.website.com). Thus, the sources for each web content is effectively obscured and hidden. The obfuscation server 410 may also generate translation keys for each path for translating the obfuscate values and stores the original paths in association with its respective key10. Thus, the source file 310 has been obfuscated, effectively hiding the original source of web content from the end user device 110 and making it appear as though the obfuscated source file 510 was received from the server 130a.

The obfuscation server 410 may store the original source file 310, translation keys, and IP addresses for servers in the storage device 415.

After obfuscation of the source file, the obfuscation server 410 sends the obfuscated source file 510 to the web browser on the end user device 410 (S8). The obfuscated source file 510 includes the obfuscated values 512-518 from which the web browser 112 can create a GET list. As discussed above, FIG. 3B illustrates an example of the original GET list 320 that may be generated by the end user device 110 to request web content indicated in the source file 310, where image1.jpg and image2.jpg are hosted by server 130a, ad1.jpg and ad2.png are hosted by server 130b, and content.png is hosted on server 130c. Whereas, FIG. 5B illustrates an example of an obfuscated GET list 520 the end user device 110 generates based on the obfuscated source file 510. Obfuscated GET list 520 is referred to as an obfuscated, because from the view point of the server 130a, the GET list has been obfuscated from a conventional GET list (e.g., GET list 320). However, from the view point of the end user device 110, the GET list conforms with conventional methods of generating a GET list because the end user device 110 has created the GET list based on the source file that was received. As shown in FIG. 5B, the obfuscated values 512-518 are used as the web content pathways 522-528 of the obfuscated GET list 520.

Turning to FIG. 4B, after creating the obfuscated GET list 520, the end user device 110 communicates the obfuscated GET list 520 to the obfuscation server 410 (S9). For example, the end user device 110 sends the obfuscated GET list 520 to obfuscation server 410 for web content in the obfuscated GET list 520 for use in rendering a webpage. As noted above, the end user device 110 is still operating as though it is in communication with the server 130a.

Upon receiving the obfuscated GET list 520, the obfuscation server 410 translates the obfuscated GET list 520 to retrieve original values of the corresponding web content for rendering the webpage from the server 130a (and/or servers 130b and 130c). For example, using the pathways 522-528 of the obfuscated GET list 520, the obfuscation server 410 translates the pathways 522-528 using the translation keys stored in storage device 415 and remaps original values (e.g., paths 312-318). Since these paths 522-528 were generated and correspond to the paths 512-518 in the obfuscated index, the corresponding translation key can be retrieved and the paths 522-258 translated to the original values as shown in FIG. 5C. From the translation, the obfuscation server 410 then generates a server GET list 530 shown in FIG. 5D of original values 532-538 that correspond to original paths 312-318 (e.g., similar to the GET list 310 and paths 322-328).

With the server GET list 530, the obfuscation server 410 retrieves web content and objects using its own GET request. That is, the obfuscation server 410 retrieves the IP addresses for servers 130a (and/or servers 130b and 130c) and transmits the GET list 530 as request to the servers (S10). For example, the obfuscation server 410 retrieves image1.jpg and image2.jpg from server 130a (S10a and S11a), retrieves ad1.jpg and ad2.png from server 130b (S10b and S11b), and, retrieves Banner.png from server 130c (S10c and S11c).

The obfuscation server 410 then obfuscates source identifiers of the retrieved web content and objects and communicates the obfuscated web content and objects to the end user device 110 (S12). For example, the obfuscation server 410 changes the filename of the retrieved web content into a new, obscure value. In various embodiments, the obfuscated values for the web content may be based on the corresponding path 512-528 in the obfuscated source file 510. That is, filenames for each piece of web content and/or object may be obfuscated based on a corresponding path 512-518. Thus, when communicated to the end user device 110, the web browser 112 ingests the received obfuscated content and renders the webpage as though the content was received directly from the servers 130a (and/or servers 130b and 130c).

In an embodiment, the content data can also be obfuscated in any superfluous way that does not alter the manner in which the web content is displayed, but alters the characteristics or properties of the content file. For example, the size of web content can be changed by adding superfluous bits to change the hash making it look different than the original web content. Where the web content is, for example, an image, the size of the image file can be changed by adding superfluous bits to change the hash making it look different in size than the original image. For example, the file name of image1.jpg having a hash ff5464 can be obfuscated by changing the filename to randomcontent.jpg and also changing the content of the file so the hash results in 88YFL4. Thus, both the filename and size of the content maybe changed so to hide the source and description of what the content is. While the example above is provided for an image, one skilled in the art will recognize that the same approach may be used one any type of web content (e.g., audio, textual, video, etc.).

As another example, where the web content is a JavaScript file the method in the JavaScript file may be obfuscated as well. For example, the web content maybe a jquery.js file having a method called "showad" which dynamically shows an ad somewhere in the webpage. The "showad" method in the jquery.js file may be obfuscated to something else, for example, "method_1". "Method 1" would be executed similar to "showad", such that all things that called "showad" would need to call method_1 instead. Thus, it is unknown what the method is actually called and therefore can't be easily blocked by something on the web browser side looking for a specific method or call. Using a JavaScript file as an example again, in some embodiments, the JavaScript file can be fully obfuscated by storing the original method call in the obfuscation server 410 as a translation key paired with the obfuscated method call. The JavaScript method call may then be made as a server side call where the end user would click on a method call which would cause a POST back and the JavaScript call to be executed by the server instead of the web browser. The obfuscated webpage (based on whatever the JavaScript method does) is sent back to the end user device as if the end user just clicked the method call. Thus, as an example, the un-obfuscated JavaScript include showad {javascript code here}, which can be obfuscated and executed as method_1

{dopostback value="obfuscated value as declared in the key/value (dopostback=javascript code here; key=value)}.

While the examples described in connection to FIGS. 4A-5D are provided in the context of a GET request, the functionality of the obfuscation server 410 may also apply to POST requests (as illustrated above), where the end user device 110 transmits POST requests based on the obfuscated source file.

Accordingly, the end user device 110 does not communicate directly with any of servers 130a-c, and thus the web browser 112 does not realize that the web content was received from the obfuscation server 410. That is for example, the end user device 110 and its web browser never see server 130b or server 130c that host advertisement-based web content. To the web browser, it appears that all web content was received from server 130a in this example. The two origin serves 130b and 130c are hidden (along with server 130a which is never communicated with directly by the end user device 110) by using obfuscation server 410 as a translation and GET server in this example. Similarly, the end user device 110 never communicates directly with server 130a, instead the end user device communicates with the obfuscation server 410 believing that the obfuscation server 410 is the server hosting the web content. Thus, the servers 130 are secured and need not be exposed to external attacks.

Since the end user device communicates with only the obfuscation server 410, the end user device 110 is unable to discern where content comes from. Furthermore, since each piece of web content is obfuscated, the end user device 110 is also unable to discern what each piece of web content is, yet the end user device 110 remains able to render the webpage correctly. Thus, embodiments disclosed here may inhibit many addons and blocking programs that block certain content and/or webpages, such as advertisements or specific images, from being rendered by the web browser. Servers may have to transmit data more frequently because, in various embodiments, the web content and/or IP address of hosting servers is not cached by the end user device 110 for future visits, and thus has to generate GET requests each time it accesses the webpage.

In some embodiments, a whitelist may be provided that indicates one or more pieces of web content of the webpage that is not to be obfuscated. That is, for example, the web content from server 130a (e.g., www.website.com/image1.jpg and www.website.com/image2.jpg) may be transmitted to the end user device 130a by the obfuscation server 410 unaltered as if received directly from the server 130a. For example, the owner of the server 130a may identify web content in a whitelist that the obfuscation server 410 is not to obfuscate when generating the obfuscated source file and/or obfuscated web content. Thus, if an owner of a webpage can decide to permit end users to discern the source of certain content. In some embodiments, the whitelist may be stored at the obfuscation server 410, for example, in association with a given server (e.g., the IP address of the server) in the storage device 415 for querying by the obfuscation server 410. Thus, when the obfuscation server 410 receives a GET request (S3) from the end user device 110, the obfuscation server 410 accesses the white list and determines which source identifiers to obfuscate based on the web content in the whitelist.

The whitelist may be included as part of any kind of flat file, configuration file, database entry, memcached entry, etc. The whitelist (and/or file containing the whitelist) may be located either at the storage device 415 of the obfuscation server 410 or at another server that the obfuscation server 410 queries to retrieve the whitelist. The whitelist may be a stand-alone ignore file or included in a configuration file, either or both of which can be created for each webpage of website or the website as a whole. The webpage owner may indicate the web content that is to not be obfuscated by listing the content in the whitelist that is uploaded to the obfuscation serve 410 (or the another server). As with the obfuscation server 410, any sever on which the configuration file (or ignore file) is located may be configured for internal use only, so that no outside source should be able to get to either the translation/obfuscation server or (if on a different server) the whitelist or query-able server in which the whitelist (or other configuration files) are stored.

In another embodiment, the content (and/or groupings of content in the source file that can be dynamically updateable content) maybe tagged or marked in the source file and the obfuscation server 410 can be configured to not obfuscate the source identifiers of the tagged content. The source file with tagged or marked content may be referred to as a "template" file, which may be provided in response to a request for the source file from the obfuscation server 410. The template file may include such tags as any mundane static object associated with one or more pieces of content of the source file that are understandable by the obfuscation server 410. The tags need not follow any sort of standard as long as the obfuscation 410 server is programmed in a way that it will understand whatever it is provided. Template files can be created beforehand for quicker handling.

In various embodiments, the obfuscation server 410 may be configured to execute client-side script (e.g., JavaScript or the like) or obfuscate and pass through client-side script for execution by a sever behind the obfuscation server 410. For example, the obfuscation server 410 (or the sever behind the obfuscation server 410) may execute and render the webpage or perform some functionality offered by the webpage and then provide the results to the end user device 110. The webpage would appear to the end user to have been executed using client-side scripting at the web browser 112, but such processing was instead performed remotely at the obfuscation server 410 (or the sever behind the obfuscation server 410). In an example implementation, client-side script, such as functions provided in JavaScript or other client-side executable coding language, can be stored in the storage device 415 and obscured similar web content as described above. The client-side code can be accessed by the obfuscation server 410 and then executed therein or passed to a subsequent server. For example, when a user inputs a selection on the end user device 110, the input is transmitted to the obfuscation server 410, obscured, and executed therein or downstream using the client-side scripting stored in the storage device 415. The obfuscation server 410 then transmits the results back to the end user device 110, as though the process was executed at the end user device 110. Such embodiments, where the JavaScript or any other type of script is obfuscated and set to be executed on the end server network, may make it harder to find vulnerabilities on a server since everything has to go through a central server (e.g., the obfuscation server 410 or any other behind the obfuscation server 410) before anything is executed. Because the code is obfuscated there is no way to tell what a particular script will do as the source is hidden. This also makes it almost impossible to do any script hijacking from a third party or user changing of the function that is meant to be called (e.g., random values or different data can't be put into the script and sent back to cause unintended consequences).

A non-limiting advantage of the embodiments disclosed herein, is that the server operators and/or website owners do not have to recreate webpages or add special code to function as designed with the embodiments described herein. Server operators and/or website owners need only subscribe to or elect to utilize the services. From there, the IP address of the server in the DNS 120 may be updated to resolve a DNS request for a webpage to the location of the obfuscation server 410.

In some embodiments, the server may be required to utilize plain text HTML files to ensure that the obfuscation server 410 can properly process the source file. In embodiments where internet-based data is encrypted by servers outside of the obfuscation process, a certificate or decryption key may be downloaded at the obfuscation server to permit decoding and processing of the internet-based data. For example, a "man in the middle" or MITM method may be implemented to encrypt data, where an MITM server is communicatively (e.g., wired or wirelessly) between the end user device 110 and the server hosting requested encrypted data and the MITM server operates to decrypt the data. The MITM server maybe comprised in the obfuscation server 410 or as another, separate proxy server. The MITM server may execute a pseudo man in the middle attack (using a program such as mitmproxy or any kind of program that intercepts and can decode encrypted data and allow for changes to be made before sending it to the end user device 110) using any encryption/decryption algorithm (e.g., hash algorithm such as MD5, SHA, RIPEMD-160, Whirlpool, SHA, CRC32 etc. and any cryptography algorithms known in the art). In some embodiments, the server hosting web content (and the obfuscation sever 410 if it is not acting as the MITM sever) may accept the certificate or decryption keys from the MITM server so that data can be encrypted and decrypted as needed to respond to the various requests for providing internet-based data to end users. In this way the MITM server may act as a certificate authority (e.g., a company that is trusted to check whether a certificate is valid or not) and other servers in the system will automatically accept encrypted traffic, such that encryption or decryption would be unnoticed by the end user device. The original certificates can be located on the obfuscation server 410 so that it can use the original certificates, specific to a given website, so to function as though the obfuscation server 410 is a generally recognized certificate authority, thereby making it so websites don't break when they use their own certificate versus using a "public" to the network certificate.

Some embodiments disclosed herein may be configured to permit users to send links to webpages and/or specific content therein to other users and/or devices, even though the content has been obfuscated as described herein. For example, in various embodiments, the translation keys, original values, and obfuscated values may be stored in the storage device 415 for a predetermined amount of time. To mitigate circumventing the disclosed system, the predetermined amount of time may be set to be to be as short as possible, while providing enough time for web browser to receive content and render it on the end user device and permit the webpage to function as designed. Accordingly, the predetermined amount of time may be on the order of seconds and/or minutes, such as 10 seconds, 20 seconds, 1 minute, etc. However, if the timeout period is too short, then end users would be unable to share webpages or content between devices, for example, because a shared link would become unusable after the predetermined amount of time (referred to herein as a timeout period). Thus, some embodiments may be configured to allow end users to extend (e.g., increase the length of time) of the timeout period. For example, a button or link may be generated that is associated with a piece of web content. The user may operate the button or link to instruct the obfuscation server 410 to increase the timeout period that the values for the associated content are stored. For example, the obfuscation server 410 may be instructed to increase the period of time as desired by the end user to ensure that values in the storage device 415 for the receiving device has time to ingest and process the shared link. For example, the timeout period may be increased to several minutes or more, one or more hours, one or more days, one or more weeks, or any timeout period that is appropriate to ensure the shared content remains accessible to the receiving device. The increase may be static (e.g., the same increase in time is applied whenever the content is shared) or dynamic (e.g., the button or link instructions to increase the time permits the user to select a desired increase). In some embodiments, the timeout period may be extended automatically in response to a user creating a link and sharing content. Once the timeout period has expired, be it the predetermined timeout period or extended timeout period, then the link has expired (e.g., the values have been removed from the storage device 415) and the receiving user will be unable to access the content.

The timeout period may be set in, for example, a configuration file located either at the storage device 415 of the obfuscation server 410 or at another server that the obfuscation server 410 queries to retrieve the timeout period. The configuration file containing the timeout period may be the same file as that containing the whitelist or maybe a different configuration file (e.g., any kind of flat file, JavaScript file, etc.). In some embodiments, a common timeout period may be applied to an entire webpage or website. Thus, the configuration file may comprise one timeout period that is applied to all content of the webpage or website. In another embodiment, a timeout period may be associated with a given piece of content, content type (e.g., video as compared to text, images, etc.; banners or advertisements as compared to content of the website such as an article, message stream, etc.), and/or source (e.g., web server 130*a* as compared to web server 130*b*). Thus, each piece of content may be associated with its own timeout period.

In some embodiments, the owner of the webpage may indicate content that is permitted to be shared using the extended time period embodiments described above. For example, the source file or a template file (as described above) may comprise executable code associated with one or more pieces of content that either indicates the time period for certain content can be extended or, reversely, that the time period for certain content cannot be extended.

Similarly, extending the timeout period as described above may be utilized to permit other webpages and/or bots to use content and/or search a webpage as permitted by the owner. For example, in order for organizations, aggregators, robots (bots), or search engines, for example like archieve.org, to work appropriately they may need to access un-obfuscated content in order to retrieve pictures and other information that the webpage owner wishes permit access to, such that the content can be used for their purpose and still be able to match search terms, make a site more findable, etc. The white list described above may be used for a similar purpose. The owner of the web hosting service or of the server can also make arrangements with known entities and give them special permission. For example, bots, archive servers, etc., may be given permission to access un-obfuscated content by giving them special keys, "whitelist" specific IP addresses, have a login system to access a special network (e.g., through another server that has access to local files in some embodiments) that would then work as an API for the above to query for specific or full website content as it was meant to be seen without modification. In the case of archive.org full access may be needed to keep up with their snapshots and to make it so that sites are un-obfuscated and navigable as if they just went to the site directly and followed all of the links.

Figure 6:
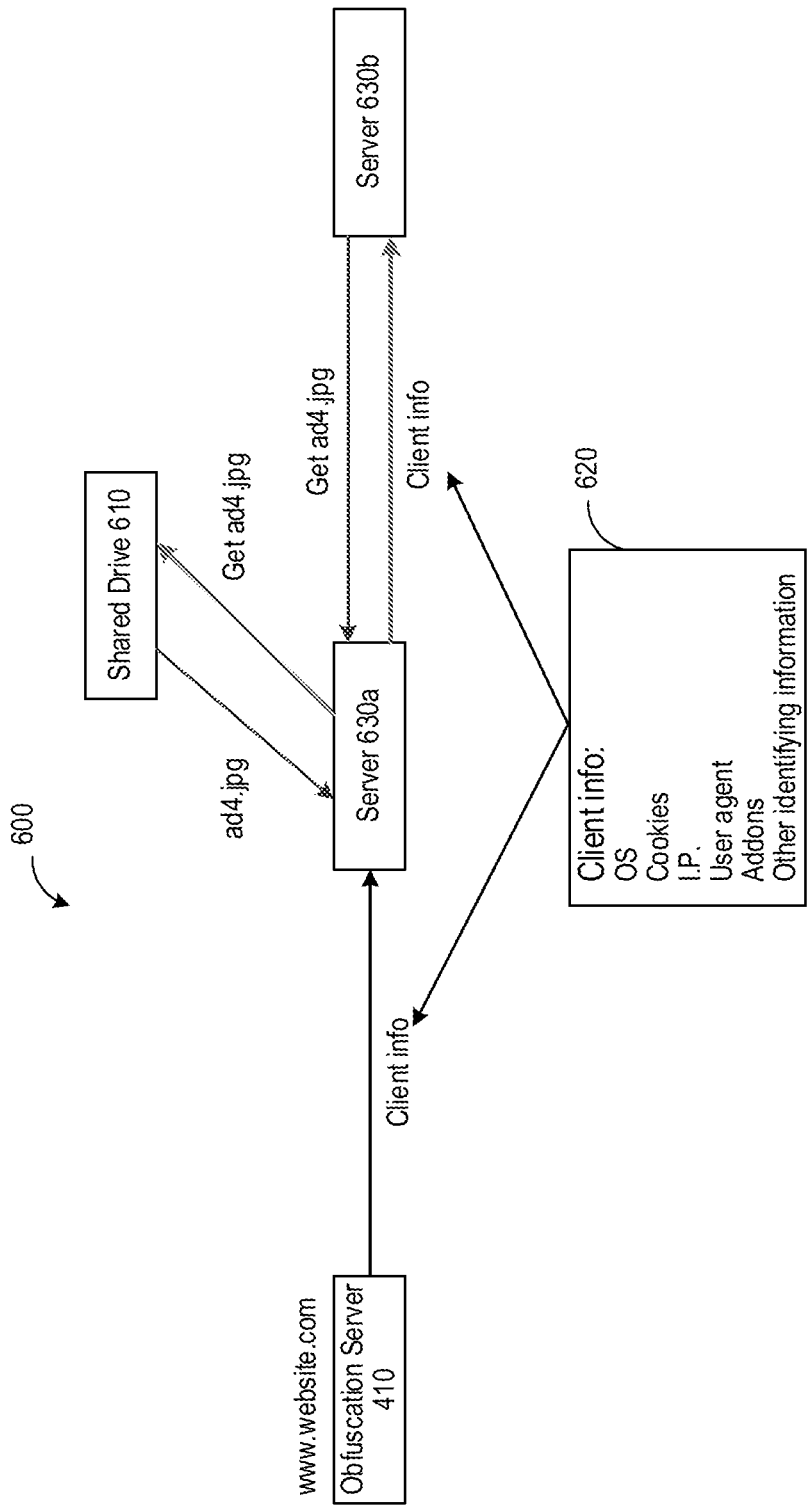
FIGS. 6-8 schematically illustrate graphical representations of various examples of obfuscation and translation systems in accordance with embodiments disclosed herein.
Figure 7A:
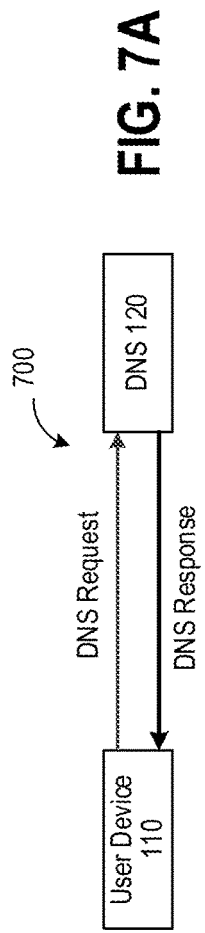
Figure 7B:
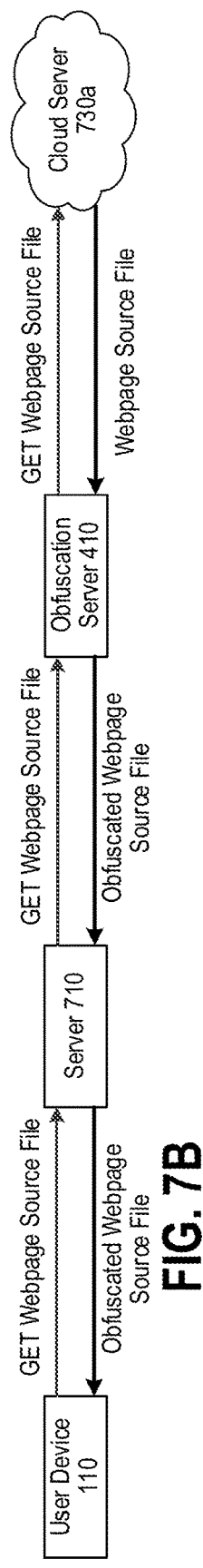
Figure 7C:
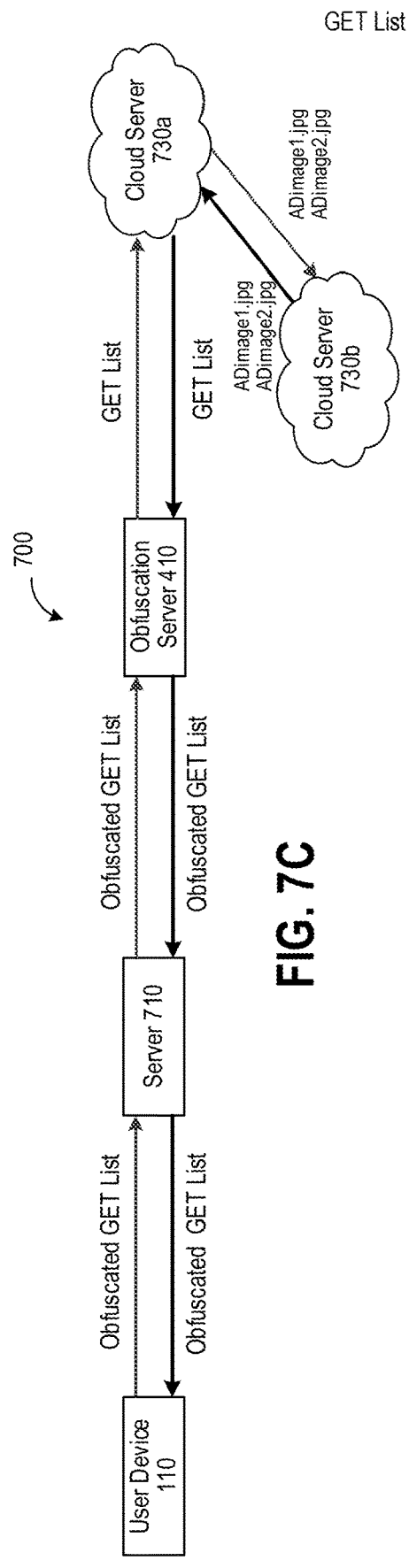
Figure 8:
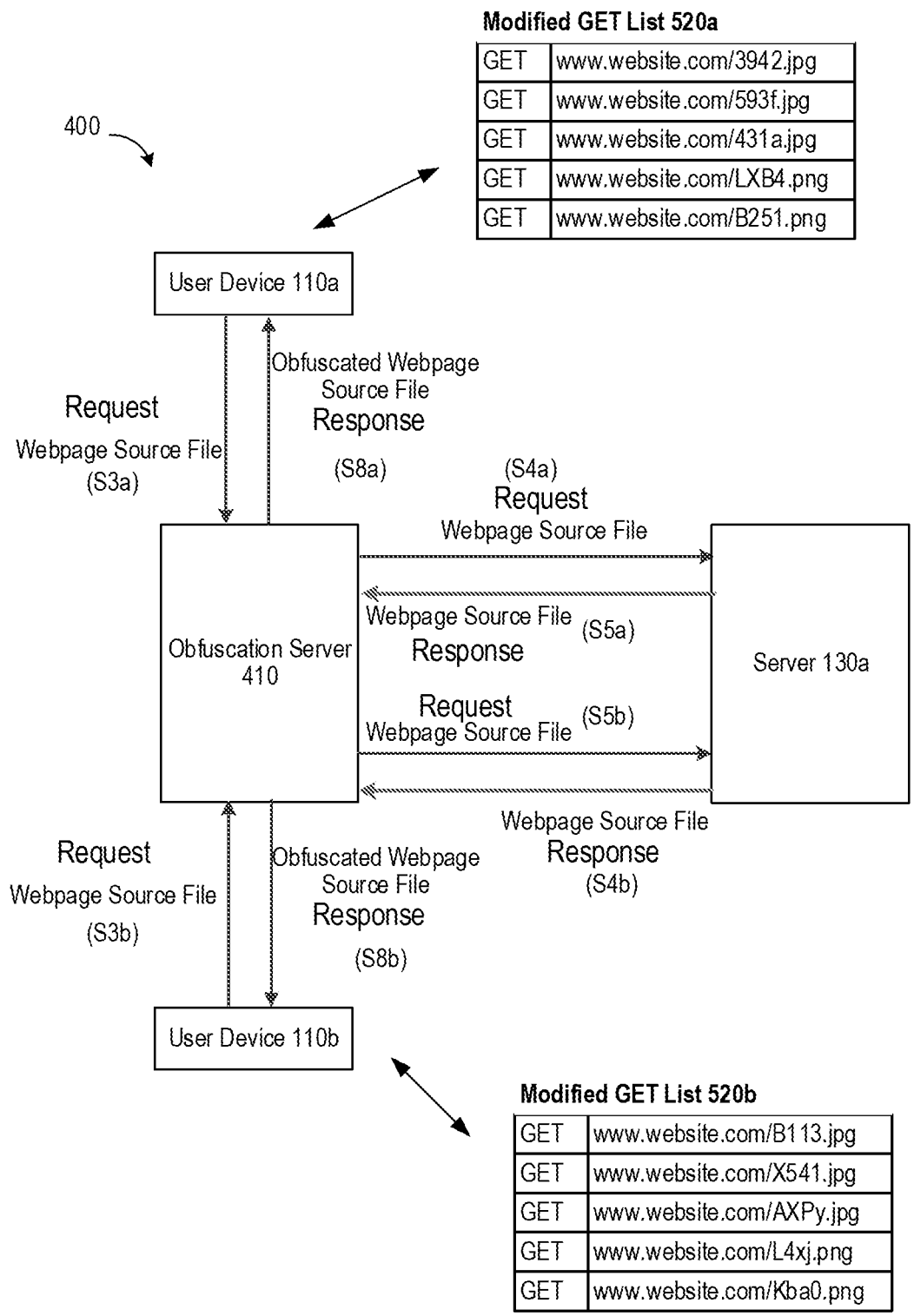

FIGS. 6-8 illustrate various other embodiments of obfuscation systems in accordance with the present disclosure. The systems in FIGS. 6-8 may be substantially similar to that of FIGS. 4A and 4B, except as provided below. The systems in FIGS. 6-8 may be implemented as part of system 400 and/or as a different system. Thus, the systems described herein are not mutually exclusive and the features of each embodiment may be combined as will become apparent to one skilled in the art.

FIG. 6 illustrates an example system architecture 600 configured to retrieve personalized content based on client information. The system 600 includes the obfuscation server 410 that functions to obfuscate the personalized content along with other content as set forth above in FIGS. 4A and 4B.

The system 600 also includes a server 630a that receives communications from the obfuscation server 410. As in FIGS. 4A and 4B, an end user device (not shown) requests to access a webpage hosted by a server 630a, the request is provided the obfuscation server 410, which forwards the request to the server 630a. The server 630a may be part of a server cluster and/or cloud server comprising a plurality of servers (physical or virtual) hosting a webpage. The plurality of servers may be accessed via a virtual private network (VPN) and operating as one or more thin-clients. Each server may be communicatively coupled (e.g., wired or wireless) with a shared drive 610 that stores web content for rendering the webpage and configured to retrieve content the shared drive 610.

The system 600 also includes a local server 630b. As used herein, the term "local" means that the device (e.g., local server) is local with respect to the server cluster or cloud sever. In some embodiments, the server 630b may be implemented as a thin-client, accessed by the server 630a via a VPN, to implemented the functionality thereon. The local server 630b may be hosted by the server 630a and configured to identify personalized content for a user that is stored on the shared drive and instruct the server 630a to retrieve personalize content for inclusion in a response (e.g., as part of a source file) to the obfuscation server 410.

In operation, FIG. 6 the obfuscation server 410 receives a request from an end user device to access a webpage (e.g., S3 of FIG. 4A). The server 630a may comprises a GET server configured to issue a GET request to local server 603b for content to be included in the source file (e.g., instead of being performed by the obfuscation server 410 as shown at S6 and S7 of FIG. 4A). The local server 630b identifies content and responds with instructions to the server 630a to retrieve identified content. The server 630a receives a response back from the local server 630b with the identified content. The server 630a then communicates a GET request to the shared drive 610 and retrieves the identified content. After the web content is retrieved by the server 630a, the process of FIG. 6 continues as outlined in FIGS. 4A and 4B (e.g., the retrieved web content and its location is added to the index page that is communicated to the obfuscation server at S5).

In various embodiments, the local server 630b may utilize a digital footprint to identify content to be included in the source file. For example, the local server 630b may process the digital footprint and identify content that corresponds to the digital footprint (e.g., personalized content). Identifying personalize content may comprise identifying content having a higher probability (as compared to other content) that the user will interact with or consume based on the user's digital footprint.

In some embodiments, the digital footprint may be client information 620. received from the end user device via the obfuscation server 410 as illustrated in FIG. 6. The client information 620 may include, but is not limited to, an operating system identifier (e.g., Windows®, macOS, Linux®, etc.), identification of any cookies previously set in a web browser, IP address of the end user device, an indication of the browser engine for the web browser of the end user device (e.g., which tells, for example, a webpage what specific web engine has requested the webpage so the server determine style sheets and other browser specific content), indication of addons installed on the web browser (if any), geographic information, time stamp of communications, and any other identifying information. The translation server 410 can forward the client information 620 to the server 630a, which send the client information 620 to the local server 630b, either along with its GET request or as separate communication.

In another embodiment, either alone or in combination with the client information 620, the local server 630b may access a digital footprint of the requesting user stored in the shared drive 620. The stored digital footprint may include similar information as that provided in the client information 620. However, the information stored in the shared drive 610 may not be as current as that provided by the client information 620.

As an example, the local server 630b may be an advertisement server configured to identify advertisement content based on the digital footprint. In this case, based on the client information 620 and/or an existing digital footprint, the server 630b identifies a piece of ad content (e.g., ad4.jpg) corresponding to the digital footprint. That is, for example, web content that is relevant to a user's browsing history may be identified and included in the instructions to the server 630a. Similarly, content may be identified that is relevant to a geographic location of the user or time stamp of the request (e.g., the time of day, how the sun is angled in the sky today, geographic location, etc.). Similarly, content may be identified that functions one a given operating system and/or web browser. The server 630a receives the response with the identified content and retrieves the identified content from the shared drive 610 (e.g., as a GET ad4.jpg request). The identified content is then added to the source file, provided to the obfuscation server 410, and the process proceeds as set forth in FIGS. 4A and 4B.

FIG. 7A-7C illustrates another example system architecture 700 according to embodiments disclosed here. The system 700 may be similar to that of system 400 and comprises the obfuscation server 410 configured to obfuscate source identifiers of content as described herein.

The system 700 also includes a server 730a and 730b, each of which host web content. Server 730a is illustratively depicted as cloud server, but may be implemented as a server cluster and/or a single server. Server 730a may be similar to server 130a described above, in that server 730a hosts web content for a request webpage. Similarly, server 730b is illustratively depicted as another cloud server, but may be implemented as a server cluster and/or a single server. Server 730b may be similar to servers 130b and/or 130c described above, in that server 730b hosts web content that is to be included in the source file but is not hosted on server 730a and must be retrieved from other servers.

In the illustrative embodiment of FIG. 7B the content hosted on server 730a can be retrieved from a database communicatively coupled to the server 730a and/or an internal content delivery network coupled to a shared drive (e.g., as described above in FIG. 6). The content hosted on server 730b, on the other hand, is retrieved using GET requests from other devices. As illustratively shown in FIG. 7B, the server 730a may issue GET requests for content (for example, as described in connection to FIG. 6). Alternatively, the translation server 410 may issue GET requests to the server 730b (as described in connection to FIG. 4B). Server 730b is separate from server 730a, in that server 730a and 730b are not part of the same cluster or cloud instance.

The system 700 also comprises a server 710 (sometimes referred to herein as an interfacing server) communicatively between the end user device 110 and the obfuscation server 410. The server 710 may be configured as a pass-through server that exchanges communications with the end user device 110. The end user device 110 may communicate directly with the server 710, which keeps the rest of system 700 hidden from the end user device 110. The server 710 may be any type of server or computing device. The server 710 may be implemented as a virtual server operating as a thin client providing user access to system 100; a proxy server; a load balancer; etc. Any computing device may be implemented as server 710 as long the device is configured to provide pass through capabilities and interface between the end user device 110 and the system 700.

In operation, FIG. 7A illustrates that the end user device 110 queries the DNS server 120 for a desired webpage. The DNS server 120 responds with the IP address of the server 710. As shown in FIG. 7B, the end user device 110 then sends a GET request for the source file of the webpage (e.g., source file 310) to the server 710, which passes the request to the obfuscation server 410 and to the server 730a. The serve 730a responds with the source file and the obfuscation server 410 obfuscates the source file as described above in connection to FIGS. 4A and 4B. The obfuscated source file (e.g., obfuscated source file 510) it is transmitted back to the server 710, where it is transmitted to the end user device 110 and the web browser thereon.

Turning to FIG. 7C, the end user device 110 generates an obfuscated GET list (e.g., GET list 520) from the obfuscated source file and sends the obfuscated GET list to the server 710. The server 710 forwards the obfuscated GET lit to the obfuscation server 410, which translates the obfuscated GET list into the original GET list. The obfuscation server 410 issues a GET request using the translated (or original GET list) to the server 730a. Server 730a retrieves content hosted thereon, as well as issuing its own GET request to server 730b to retrieve web content therefrom (for example, as described above in FIG. 6). In this case, Image1.jpg, Image2.jpg, and Banner.png may be retrieved server 730a, while ADimage1.jpg and ADimage2.jpg are illustratively retrieved from server 730b. After the server 730a retrieves the requested content it then sends the web content to the obfuscation server 410, which obfuscates the web content (e.g., as described above in connection to FIG. 4B) and transmits the obfuscated web content to the server 710. Server 710 sends the obfuscated web content to the web browser on the end user device 110.

According the illustrative example of FIGS. 7A-7C, the obfuscation server 410 is behind the server 710 and the end user device 110 does not recognize knows that it is communicating with server 710 that is operating simply as a pass-through device. Thus, in various embodiments, the obfuscation system disclosed herein may create a cloud network of servers and ensure sure that the end user device 110 cannot interpret the source of web content (e.g., directly communicates with or can interpret values to determine where content was from). Instead, the end user device 110 communicates with the server 710 acting as a pass-through server. This effectively restricts the ability of an end user device to block an IP address or Domain Name without blocking everything received from the server 710. Accordingly, the systems disclosed herein are configured to ensure that sources of web content are hidden from the end user device, without requiring the owner or operator of a website hosted on a server to code a special software. Furthermore, as a transparent system, webpages are rendered at the end user device as intended by webpage owners and end users are unable to tell the difference.

In some embodiments, the obfuscation system disclosed herein is configured to uniquely obfuscate each piece of web content such that no two pieces of web content contain the same obfuscated values. For example, the obfuscation system may check a storage device to confirm that an obfuscated value does not already exist for previously obfuscated data. If the obfuscated value exists, then the obfuscation system re-executes the obfuscation to generate another value and rechecks the storage device.

For example, FIG. 8 illustrates a portion of system architecture 400 for obfuscating web content for a plurality of end user devices according to embodiments disclosed here. More particularly, FIG. 8 depicts two different end user devices 110a, 110b and shows that each user receives different obfuscated values from the obfuscation server 410. For example, each user 110a, 110b may request access to the same webpage and receive obfuscated source files, but each obfuscated source file contains different values (e.g., differently obfuscated path ways). The end user devices 110a, 110b each generate respective obfuscated GET lists 520a, 520b based on the respectively received obfuscated source file. Each obfuscated GET list 520a, 520b comprises different values for each content path as between each GET list. However, even though the content paths of each GET list 520a, 520b are different, both end user devices 110a, 110b are able to request and render the same webpage.

The process illustrated in FIG. 8 is substantially similar to that described above in connection to FIGS. 4A and 4B, except that FIG. 8 depicts a portion of the process illustrated in FIGS. 4A and 4B. Furthermore, it will be appreciated that steps in FIG. 8 having common references numbers to those in FIGS. 4A and 4B refer to steps that are similarly executed and similarly situated as compared to other steps. For example, S3a and S3b of FIG. 8 are substantially similar to step S3, except that S3a and S3b are related to different end user devices 110a and 110b. Furthermore, some steps of FIGS. 4A and 4B are omitted for clarity of depiction and explanation; however, it will be appreciated that the omitted steps may be performed as described in FIGS. 4A and 4B.

In operation, after receiving a DNS response (e.g., S2 of FIG. 4A), end user device 110a sends a GET request (S3a) and the obfuscation server 410 requests the source file from the server 130a (S4a). The server 130a returns source file (e.g., source file 310) to the obfuscation server 410 (S5a), which obfuscates the source file to produce obfuscated source file. The obfuscated source file is provided to the end user device 110a (S8a) and the end user device 110a generates an obfuscated GET lists 520a based on the received obfuscated source file. Similarly, the end user device 110b communicates a GET request to the same webpage (S3b). The obfuscation server 410 receives the source file (e.g., source file 310) based on the GET request from end user device 110b, and obfuscated the source file to produce obfuscated source file. The obfuscated source file is communicated to end user device 110b (S8b), which generates an obfuscated GET list 520b based on the obfuscated source file. While the obfuscation server 410 is illustrated as one server, it will be appreciated that the obfuscation server 410 may be a plurality of the obfuscation servers and each user may be communicating with a different obfuscation server.

The obfuscated source file for end user device 110b is different from that received by user 110a. While the source file received by the obfuscation server 410 is the same between end user device 110a and 110b, the obfuscation of the source file results in different obfuscate values used to create each respective obfuscated source file. Thus, there is no commonality between the obfuscated source files, and if viewed side by side on a single device would appear to be related to different webpages.

In various embodiments, no two users receive the matching obfuscated source files and thus no two obfuscated GET lists are the same because of the randomized nature of the obfuscation. However, it is possible (though very unlikely) that two users may receive the same obfuscated source file. To reduce (and even avoid) the likelihood of such an occurrence, after the obfuscation server 410 obfuscates the source file the obfuscated values may be checked against those stored in storage device 415. If the obfuscate value is present in the storage device 415, then the obfuscation server 410 may execute the obfuscation again to generate a new obfuscated value and recheck to whether the new obfuscated value is present or not. If obfuscated value is not present in the obfuscation server 410, then the obfuscation server uses that value. The checking may be performed until the obfuscation server 410 is satisfied that a unique value has been generated.

Figure 9:
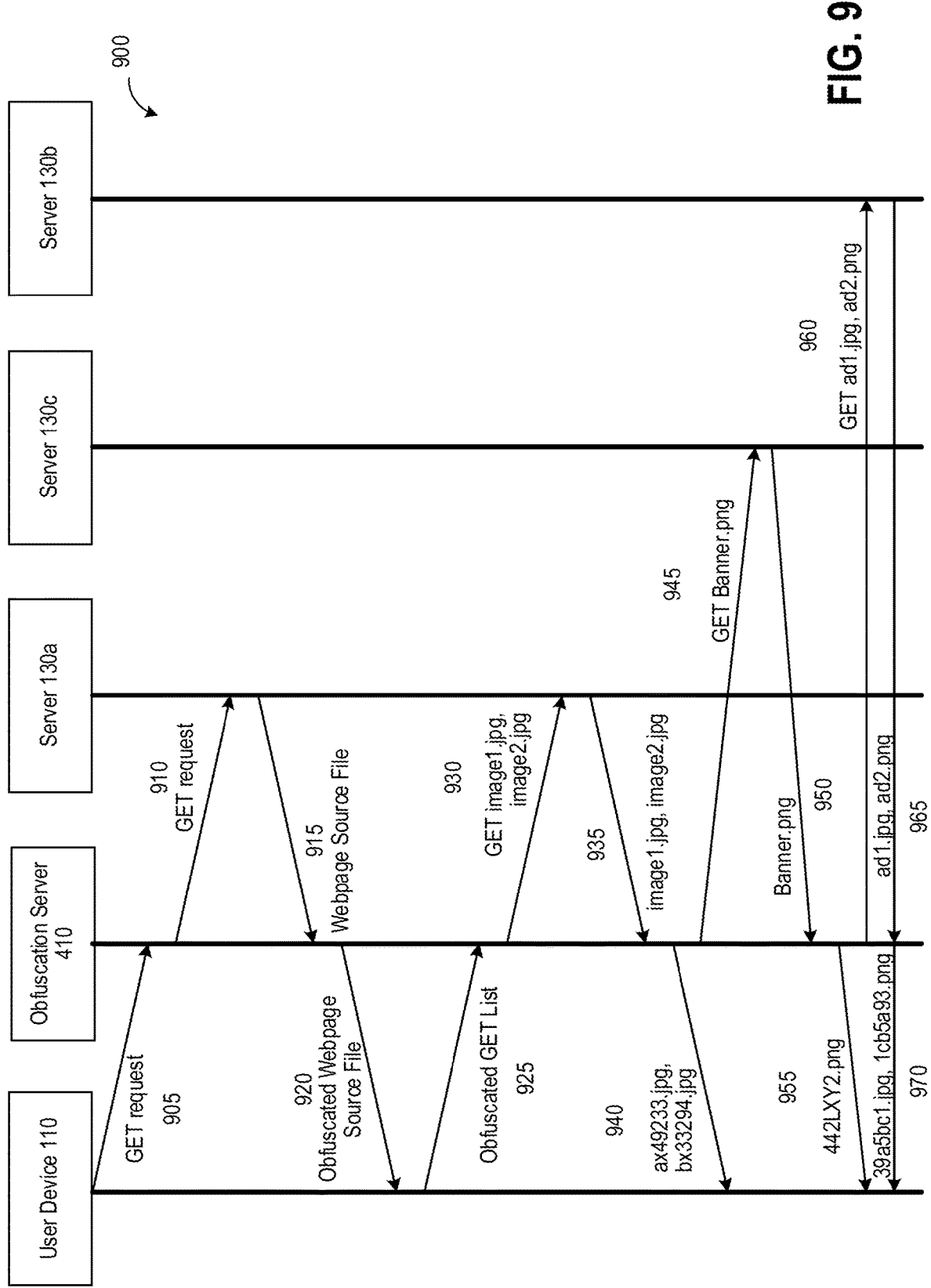
FIG. 9 is an example communication flow of obfuscating and translating internet-based data in accordance with embodiments disclosed herein.

FIG. 9 illustrates an example flow diagram of process 900 for obfuscating sources of internet-based data in accordance with embodiments disclosed herein. The process 900 can be performed by various component of the systems disclosed herein, for example system 400, 600, and/or 700. While communications shown in FIG. 9 are illustrated in a sequential manner, it will be appreciated that some or all of the communications may be executed in parallel or in a different sequence unless otherwise described as being performed sequentially (e.g., a subsequent communication is either based on or in response to a previous communication). In some example implementations, process 900 may be implemented with different, fewer, or more communications. Process 900 may be implemented as computer executable instructions, which can be stored on a memory within each component of the system, loaded onto one or more processors of one or more computing devices, and executed as a computer-implemented method.

As described in connection to FIGS. 4A and 4B, the end user device 110 receives an IP address for the obfuscation server in response to a DNS request to access a webpage (www.website.com in this example). As noted previously, the end user device 110 requested to view webpage and thus the web browser interprets the received IP address as corresponding to the server 130a hosting the given webpage. However, the received IP address is actually to the obfuscation server 410.

Having received the IP address from the DNS server, the end user device 110 transmits a GET request 905 requesting the source file for the desired webpage to the location indicated by the IP address in the DNS response. The obfuscation server 410 receives the request 905 and communicates GET request 910 requesting the source file to the server 130a hosting the webpage. The server 130a sends response 914 including the source file (e.g., source file 310) to the obfuscation server 410. The obfuscation server 410 obfuscates the source identifiers of the web content included in the source file and generates an obfuscated source file (for example, as described above in connection to FIG. 4A). The obfuscation server 410 sends a response 920 to the end user device 11a including the obfuscated source file (e.g., obfuscated source file 510).

The end user device 110 creates an obfuscated GET list based on the received obfuscated source file. As described above, the obfuscated GET list is obfuscated with respect to a conventional GET list that the end user device 110 may create based on a conventional source file (e.g., GET list 320 from source file 310). The GET list that is created by the end user device 110 is not "obfuscated" from the view point of the end user device because the end user device 110 follows conventional instructions to generate a GET list based on a received source file. Thus, while the end user device 110 may believe the GET list it creates is a conventional GET list, it is actually obfuscated or obfuscated from the view point of the server 130a.

The end user device 110 sends a GET request 925 including the obfuscated GET list to the obfuscation server 410. The GET request 925 is requesting the web content the end user device 110 needs to GET based off the received obfuscated source file. The obfuscation server 410 translates the obfuscated values of the obfuscated GET list to original values and generates the original GET lists. The obfuscation server 410 then proceeds to retrieve the web content form the servers. For example, the obfuscation server 410 sends a resource request 930 to server 130a to retrieve resources hosted thereon (e.g., image1.jpg and image2.jpg). Once received in response 935, these resources are obfuscated and transmitted to the end user device 110 as response 940.

The obfuscation server 410 also transmits a GET request 945 to the server 130c server for web content hosted thereon (e.g., Banner.png), which are received by the obfuscation server 410 as response 950. This resource is also obfuscated and communicated to the end user device 110 as response 955. The obfuscation server 410 may also send GET request 960 to server 130b for web content (e.g., ad1.jpg and ad2.png). Response 965 from server 130b includes the requested resources, which the obfuscation server also obfuscates and sends the end user device at response 970. While not illustrated in FIG. 9, the obfuscation server 410 may determine the location of servers 130b and 130c based on its own DNS request following reception of the source file from the server 130a, for example, as described in connection to FIG. 4A.

The example process 900 illustrates three servers 130a-c; however, it will be appreciated that the obfuscation server 410 may communicate with any number of servers based on the web content needed to render the webpage desired by the end user device 110. Furthermore, the GET requests from the obfuscation server (e.g., requests 930, 945, and 960) may be performed at different points of the process 900 than illustrated in FIG. 9. For example, after receiving the source file with response 915, the obfuscation server 410 may (either before response 920 or thereafter) send one or more of the GET requests 930, 945, and 960. Each request may be sent as sequential communications or one or more simultaneous communications. Thus, the translations sever 410 may receive, obfuscate, and store the web content indicated in the source file of response 915 before receiving the obfuscated GET list from the end user device 110. In this way, the obfuscation server 410 may be prepared to respond with the needed obfuscated resources once the obfuscated GET list is received in response 925.

Figure 10:
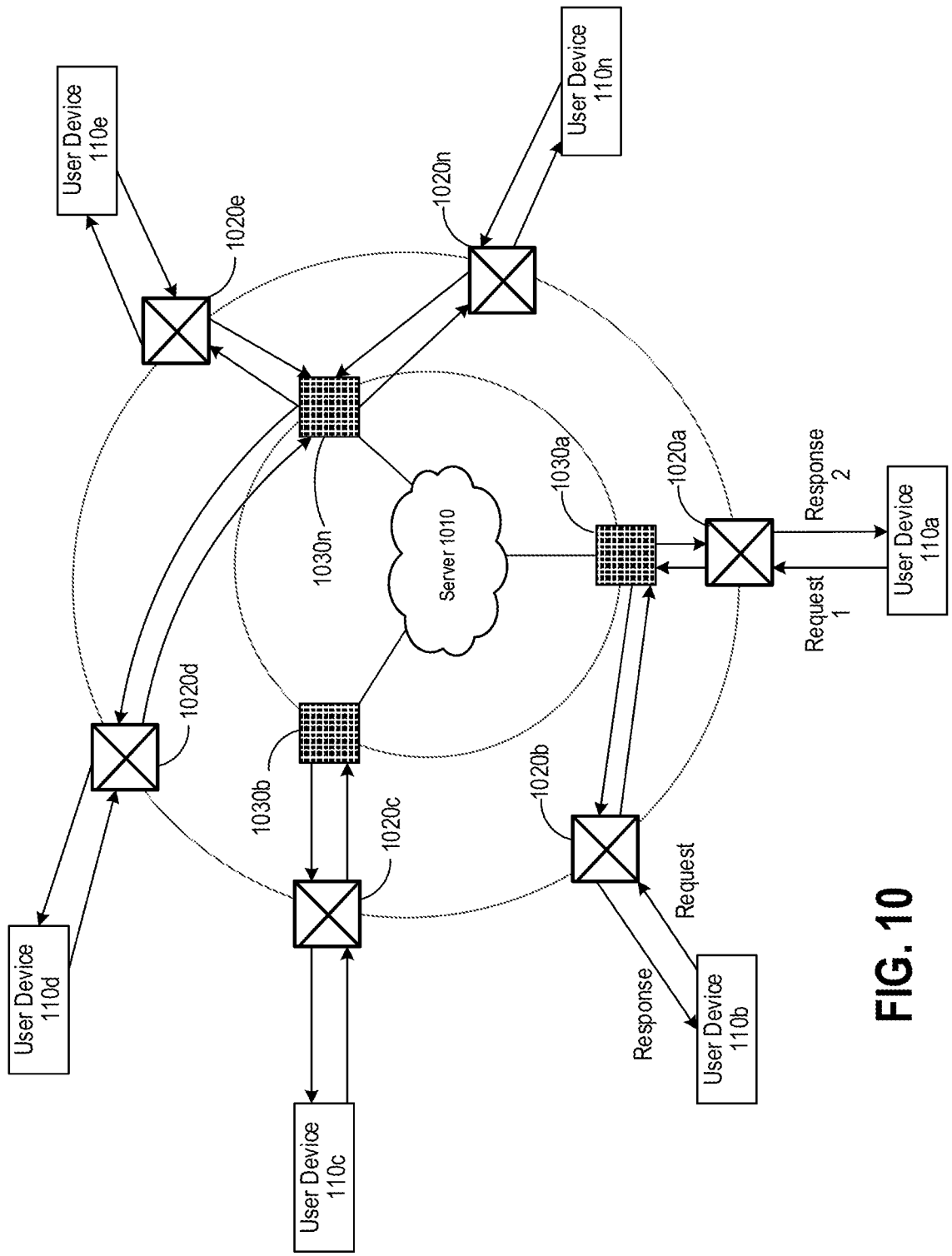
FIGS. 10 and 11 schematically illustrate graphical representations of example implementations of the obfuscation and translation systems in accordance with embodiments disclosed herein.

FIG. 10 is graphical representation of an example implementation of obfuscation system 1000 in accordance with embodiments disclosed herein. System 1000 comprises a plurality of end user devices 110a-n, each of which may request web content from a server or cloud instance of server 1010. System 1000 also includes a plurality of obfuscation servers 1030a-n configured to obfuscate source identifiers of web content as described herein and a plurality of interfacing servers 1020a-n configured as through capabilities as described in connection to FIGS. 7A-7C.

Server 1010 may be substantially similar to the servers described herein. For example, while illustrated as cloud server 1010, server 1010 may be implemented as, for example, any one or more of servers 130a, 630a, and/or 730.

The obfuscation servers 1030a-n are illustratively depicted as hatched boxes and collectively referred to as obfuscation servers 1030, respectively. Each of obfuscation servers 1030 may be substantially similar to the obfuscation servers described herein, for example, obfuscation servers 410.

System 1000 also interfacing servers 1020a-n that comprise pass through capabilities. In the illustrative example, of system 1000, the interfacing severs 1020 may be implemented as load balancers configured to balance the communication traffic across the plurality of obfuscation servers 1010; however, the interfacing servers 1020 do not need to be load balancers and at least comprise pass through capabilities. The interfacing servers 1020 are collectively referred to interfacing servers 1020, and are illustratively depicted as boxes with an "X." Each interfacing servers 1020 may be implemented as a server (physical or virtual) or other computing device. Collectively, where the interfacing servers 1020 are load balancers, the interfacing servers 1020 may be used to increase capacity and permit concurrent end user devices to access the server 1010.

Where the interfacing servers 1020 are load balancers, they may be configured to direct traffic amongst the plurality of obfuscation servers (e.g., obfuscation servers 1030 or 1120, respectively) by selecting one of an obfuscation servers for a given request from an end user device. For example, as shown in FIG. 10, end user devices 110a and 110b are directed to obfuscation server 1030a, while end user devices 110d and 110n are directed to translation sever 1030n. The load balancer that a user communicates with may be based on a relative geographically location (e.g., the end user device interacts with the geographically closest load balancer). However, the selected obfuscation server need not be the geographically closest obfuscation server. The load balancers may select an obfuscation server based on any criteria, for example, the load balancer may select an obfuscation server having the lowest amount of traffic and/or the closest geographically located obfuscation server. The selected obfuscation server need not have the lowest amount of traffic, but may selected to ensure network traffic is balanced across the obfuscation servers.

In some embodiments, a communication exchange (e.g., as shown in FIG. 9) may be broken up amongst multiple obfuscation servers via a load balancer. For example, a GET request from an end user device may go to a first obfuscation server and a subsequent obfuscated GET list from the same end user device may be directed to a different (or the same) obfuscation server. In some embodiments, this may require a shared storage accessible by obfuscation servers for storage of obfuscated values and translation keys of the web content to ensure the requested content is properly accessed and rendered. In some embodiments, the load balancers may be configured as pass through servers configured to forward requests from end user devices to downstream components.

Turning to FIG. 10, for example, end user device 110a requests internet-based data (e.g., a source file, web content, etc. as described herein) hosted by the server 1010 via request 1. In the illustrative example, request 1 is directed interfacing server 1020a (e.g., the geographically closest load balancer to the end user device 110a). In this example, the interfacing server 1020a is configured as a pass-through server and a load balancer, which selects one of obfuscation servers 1030 for sending the request from the end user device 110a. In this case, the interfacing server selects obfuscation server 1030a and forwards the request to the selected obfuscation server. The interfacing server 1020a may select the obfuscation sever 1030a based on any criteria as configured by the operator (e.g., obfuscation server having lowest relative traffic, traffic below a threshold, geographically closest server and/or within a geographical distance threshold, etc.). However, where the interfacing server 1030a is not a load balancer, interfacing server 1030a may simply pass the request to a preselected obfuscation server.

Request 1 is passed to the obfuscation server 1030a, which retrieves the web content from the server 1010, for example, in a manner substantially similar to that described in the embodiments here (e.g., FIGS. 4A-4B, 6, 7A-7C, and 8). For example, request 1 may include a GET request to retrieve a source file of a desired webpage. The obfuscation server 1030a requests the source file from the server 1010 and obfuscates the source file to generate an obfuscated source file as described herein. The obfuscated source file is then sent to the end user device 110a as response 2.

In the example of FIG. 10, the end user device 110a never communicates directly with the obfuscation server 1030a or the server 1010 (e.g., never sees either server). The end user device 110a only communicates with the interfacing server 1020a (e.g., similar that in FIGS. 7A-7C). This arrangement may deter Distributed Denial of Service (DDOS) and other attacks, because the operator of the server 1010 can arrange the load balancers 1020 to be operate as thin-clients and brought up as Virtual Machines with newly and dynamically generated IP addresses. Thus, interfacing servers that may have been subject to an attack can be disconnected and brought back up as a new Virtual Machine with a new IP address. Furthermore, by changing the IP address of an interfacing server that is directly interfacing with the end user device and/or having interfacing servers direct traffic between numerous obfuscation servers, end user devices are less likely to utilize the same obfuscation server each the webpage is requested. Thus, it may be near impossible to block an IP address of an obfuscation server.

FIG. 10 also illustrates multiple end user devices 110b-n performing similar operations and distributed to different obfuscation servers 1030 based on instructions from load balancers 1020 such that traffic to the server 1010 is balanced accordingly.

Figure 11:
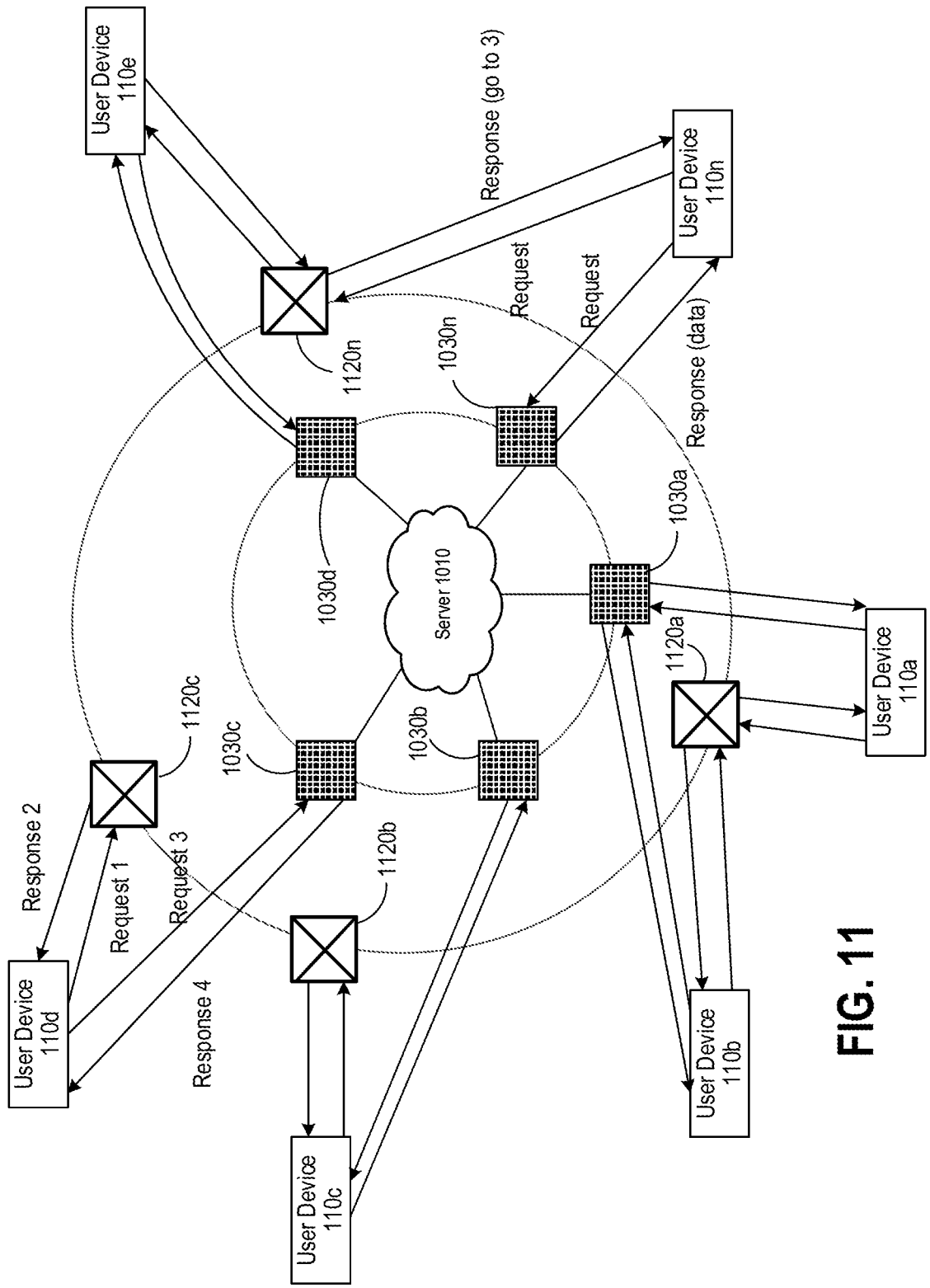

FIG. 11 is graphical representation of an example implementation of the obfuscation system 1100 in accordance with embodiments disclosed herein. System 1100 is substantially similar to system 1000, but comprises load balancers 1120a-n that do not have pass through capabilities and provide for balancing the internet traffic flow across the plurality of obfuscation servers 1030a-n.

The load balancers are collectively referred to load balancers 1020 and 1120, respectively, and illustratively depicted as boxes with an "X." As described in connection to FIG. 10, the load balancers 1120 may be configured to balance network traffic load across a plurality of servers (e.g., the plurality of obfuscation servers 1130). Each load balancers 1120 may be implemented as a server (physical or virtual) or other computing device. Collectively, the load balancers 1120 may be used to increase capacity and permit concurrent end user devices to access the server 1010. The load balancers may be configured similarly to that described in connection to FIG. 10.

Turning to FIG. 11, the implementation of the obfuscation system is similar to that described above in connection with FIG. 10, but in this example the obfuscation server 1030 may be configured as a pass-through server. In this case, the end user device 110 is directly communicating with the obfuscation server 1030 instead of hidden behind load balancers 1120. In some embodiments, the obfuscation servers 1030 may be implemented as thin clients, which permits the running obfuscation servers 1030 as Virtual Machines if more obfuscation servers are needed to handle the traffic and/or if a malicious user tries to attack the obfuscation server. It will be appreciated that the obfuscation servers 1030 of FIG. 10 (and obfuscation server 410 for that matter) may be similarly implemented as Virtual Machines.

In operation, the end user device 110d sends request 1 to a load balancer 1120c, which may include a request for internet-based data, for example, access a webpage (e.g., requesting a source file) or retrieve web content (e.g., using a GET list or obfuscated GET list as described herein), as described above. The load balancer 1120c responds with response 2, which points the end user device 110d as to where the requested internet-based data can be retrieved. In this case, the load balancer 1120c selects obfuscation sever 1030c form the plurality of obfuscation servers 1030 and includes the IP address thereto in the response 2. The IP addresses for each of the plurality of obfuscation servers 1130 may be stored in a database at the load balancer 1120c, which may select the obfuscation sever 1030c based on any criteria (e.g., obfuscation server having lowest relative traffic, traffic below a threshold, geographically closest server and/or within a geographical distance threshold, etc.).

The end user device 110d then sends the request for internet-based data as request 3, which may include a GET request as described herein. The obfuscation server 1030c forwards the request to the server 1010, retrieves the requested content and sends the content to the end user device 110d as response 4. If the request 3 included a GET request, the response 4 may include an obfuscated source file. If the request 3 includes an obfuscated GET list in accordance with the embodiments herein the response 4 may include obfuscated web content, as described above in connection to FIGS. 4A and 4B.

FIG. 11 also illustrates multiple end user devices 110a-n performing similar operations and distributed to different obfuscation servers 1030 based on instructions from load balancers 1120 such that traffic to the server 1010 is balanced accordingly.

Various embodiments disclosed herein may be applied to any networked environment, for example wireless networks of work environments and/or companies seeking to improve security for their portals and/or intranets that are accessed by users either internally and/or externally (e.g., VPN access). Embodiments herein may provide a means to transverse or provide an improved topology provide content to end users while ensuring content is render as desired by inhibiting the functionality of addons or blocking programs that may block IP addresses, domain names, or etc.

The embodiments herein may also be configured to track GET lists received from end user devices to ensure that the received GET list matches the obfuscated and translated GET lists. If a match is not found, the requesting end user device may be denied access to the webpage or restricted access until a match is confirmed. For example, the obfuscation servers herein may be configured to track GET requests (e.g., GET lists) from an end user device and confirm that the number of items in the GET list match with the number of items that were on the obfuscated GET list. Thus, an end user device can be denied service or access to the webpage until the end user device allows rendering of all content; thereby ensuring all ads and other content must be received and downloaded by the device.

Embodiments herein may increase the number of IP addresses available and/or reduce the number of external IP addresses needed by a given operator, because there the number of servers that need to be accessible by an external IP address can be reduced by hidden servers behind obfuscation servers (or interfacing servers). This means operators may be able to pay less for IP addresses and reduce how many servers need to be hardened from outside attackers. For a server operator, this can also mean reducing a need for and expense due to scanning for malware and/or data monitoring because they such functions can be sent to a centralized server (e.g., the obfuscation server in various embodiments, or another server coupled thereto) to do all the work before allowing a file to be uploaded or access to a server that may not be normally visible (e.g., via VPN connection, etc.). Anyone who needs a permanent/static IP address may still need that IP address to be visible, but for server operators may be able to use internal access for multiple servers behind an interfacing server (and/or obfuscation server) having a single external IP address, thereby lowering cost and maintenance time. Static and permanent IP addresses can still go through the same system, but they may have their own special certificate or usage that may not require an obfuscation server or device.

FIG. 12 is a functional block diagram of a computing device that can be implemented as one or more components of the obfuscation system of FIGS. 1-11. For example, a system 1250 can be used as or in conjunction with one or more of the servers, end user devices, computers, or equivalent platforms, devices, or processes of the methods and various communications described above. The system 1250 can be a server, a mobile device, or any conventional personal computer, or any other processor-enabled device that is capable of wired or wireless data communication. Other computer systems and/or architectures may be also used, as will be clear to those skilled in the art.

The system 1250 preferably includes one or more processors, such as processor 1260. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 1260. Examples of processors which may be used with system 1250 include, without limitation, the Pentium® processor, Core i7® processor, and Xeon® processor, all of which are available from Intel Corporation of Santa Clara, Calif.

The processor 1260 is preferably connected to a communication bus 1255. The communication bus 1255 may include a data channel for facilitating information transfer between storage and other peripheral components of the system 550. The communication bus 1255 further may provide a set of signals used for communication with the processor 1260, including a data bus, address bus, and control bus (not shown). The communication bus 1255 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, or standards promulgated by the Institute of Electrical and Electronics Engineers (IEEE) including IEEE 488 general-purpose interface bus (GPIB), IEEE 696/S-100, and the like.

System 1250 preferably includes a main memory 1265 and may also include a secondary memory 1270. The main memory 1265 provides storage of instructions and data for programs executing on the processor 1260, such as one or more of the functions and/or modules discussed above. It should be understood that programs stored in the memory and executed by processor 1260 may be written and/or compiled according to any suitable language, including without limitation C/C++, Java, JavaScript, Pearl, Visual Basic, .NET, and the like. The main memory 1265 is typically semiconductor-based memory such as dynamic random-access memory (DRAM) and/or static random-access memory (SRAM). Other semiconductor-based memory types include, for example, synchronous dynamic random-access memory (SDRAM), Rambus dynamic random-access memory (RDRAM), ferroelectric random-access memory (FRAM), and the like, including read only memory (ROM).

The secondary memory 1270 may optionally include an internal memory 1275 and/or a removable medium 1280, for example a floppy disk drive, a magnetic tape drive, a compact disc (CD) drive, a digital versatile disc (DVD) drive, other optical drive, a flash memory drive, etc. The removable medium 1280 is read from and/or written to in a well-known manner. Removable storage medium 1280 may be, for example, a floppy disk, magnetic tape, CD, DVD, SD card, etc.

The removable storage medium 1280 is a non-transitory computer-readable medium having stored thereon computer executable code (i.e., software) and/or data. The computer software or data stored on the removable storage medium 1280 is read into the system 1250 for execution by the processor 1260.

In alternative embodiments, secondary memory 1270 may include other similar means for allowing computer programs or other data or instructions to be loaded into the system 1250. Such means may include, for example, an external storage medium 1295 and an interface 1290. Examples of external storage medium 1295 may include an external hard disk drive or an external optical drive, or and external magneto-optical drive.

Other examples of secondary memory 1270 may include semiconductor-based memory such as programmable read-only memory (PROM), erasable programmable read-only memory (EPROM), electrically erasable read-only memory (EEPROM), or flash memory (block oriented memory similar to EEPROM). Also included are any other removable storage media 1280 and communication interface 1290, which allow software and data to be transferred from an external medium 1295 to the system 1250.

System 1250 may include a communication interface 1290. The communication interface 1290 allows software and data to be transferred between system 1250 and external devices, networks, or information sources. For example, computer software or executable code may be transferred to system 1250 from a network server via communication interface 1290. Examples of communication interface 1290 include a built-in network adapter, network interface card (NIC), Personal Computer Memory Card International Association (PCMCIA) network card, card bus network adapter, wireless network adapter, Universal Serial Bus (USB) network adapter, modem, a network interface card (NIC), a wireless data card, a communications port, an infrared interface, an IEEE 1294 fire-wire, or any other device capable of interfacing system 1250 with a network or another computing device.

Communication interface 1290 preferably implements industry promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 1290 are generally in the form of electrical communication signals 1205. These signals 1205 are preferably provided to communication interface 1290 via a communication channel 1200. In one embodiment, the communication channel 1200 may be a wired or wireless network, or any variety of other communication links. Communication channel 1200 carries signals 1205 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 1265 and/or the secondary memory 1270. Computer programs can also be received via communication interface 1290 and stored in the main memory 1265 and/or the secondary memory 1270. Such computer programs, when executed, enable the system 1250 to perform the various functions of the present invention as previously described.

In this description, the term "computer readable medium" is used to refer to any non-transitory computer readable storage media used to provide computer executable code (e.g., software and computer programs) to the system 1250. Examples of these media include main memory 1265, secondary memory 1270 (including internal memory 1275, removable medium 1280, and external storage medium 1295), and any peripheral device communicatively coupled with communication interface 1290 (including a network information server or other network device). These non-transitory computer readable mediums are means for providing executable code, programming instructions, and software to the system 1250.

In an embodiment that is implemented using software, the software may be stored on a computer readable medium and loaded into the system 1250 by way of removable medium 1280, I/O interface 1285, or communication interface 1290. In such an embodiment, the software is loaded into the system 1250 in the form of electrical communication signals 1205. The software, when executed by the processor 1260, preferably causes the processor 1260 to perform the inventive features and functions previously described herein.

In an embodiment, I/O interface 1285 provides an interface between one or more components of system 1250 and one or more input and/or output devices. Example input devices include, without limitation, keyboards, touch screens or other touch-sensitive devices, biometric sensing devices, computer mice, trackballs, pen-based pointing devices, and the like. Examples of output devices include, without limitation, cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), and the like.

The system 1250 also includes optional wireless communication components that facilitate wireless communication over a voice and over a data network. The wireless communication components comprise an antenna system 1210, a radio system 1215 and a baseband system 1220. In the system 1250, radio frequency (RF) signals are transmitted and received over the air by the antenna system 1210 under the management of the radio system 1215.

In one embodiment, the antenna system 1210 may comprise one or more antennae and one or more multiplexors (not shown) that perform a switching function to provide the antenna system 1210 with transmit and receive signal paths. In the receive path, received RF signals can be coupled from a multiplexor to a low noise amplifier (not shown) that amplifies the received RF signal and sends the amplified signal to the radio system 1215.

In alternative embodiments, the radio system 1215 may comprise one or more radios that are configured to communicate over various frequencies. In one embodiment, the radio system 1215 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from the radio system 1215 to the baseband system 1220.

If the received signal contains audio information, then baseband system 1220 decodes the signal and converts it to an analog signal. Then the signal is amplified and sent to a speaker. The baseband system 1220 also receives analog audio signals from a microphone. These analog audio signals are converted to digital signals and encoded by the baseband system 1220. The baseband system 1220 also codes the digital signals for transmission and generates a baseband transmit audio signal that is routed to the modulator portion of the radio system 1215. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 1210 where the signal is switched to the antenna port for transmission.

The baseband system 1220 is also communicatively coupled with the processor 1260. The central processing unit 1260 has access to data storage areas 1265 and 1270. The central processing unit 1260 is preferably configured to execute instructions (i.e., computer programs or software) that can be stored in the memory 1265 or the secondary memory 1270. Computer programs can also be received from the baseband processor 1210 and stored in the data storage area 1265 or in secondary memory 1270, or executed upon receipt. Such computer programs, when executed, enable the system 1250 to perform the various functions of the present invention as previously described. For example, data storage areas 1265 may include various software modules (not shown).

The various components illustrated in the figures may be implemented as, for example, but not limited to, software and/or firmware on a processor or dedicated hardware. Also, the features and attributes of the specific example embodiments disclosed above may be combined in different ways to form additional embodiments, all of which fall within the scope of the disclosure.

The foregoing descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an," or "the" is not to be construed as limiting the element to the singular.

The various illustrative logical blocks, modules, and algorithm operations described in connection with the embodiments disclosed herein may be implemented as electronic hardware, computer software, or combinations of both. To clearly illustrate this interchangeability of hardware and software, various illustrative components, blocks, modules, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present inventive concept.

The hardware used to implement the various illustrative logics, logical blocks, schematic blocks, and modules described in connection with the various embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include random access memory (RAM), read-only memory (ROM), electrically erasable programmable read-only memory (EEPROM), FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

It is understood that the specific order or hierarchy in the processes/flows disclosed is an illustration of exemplary approaches. Based upon design preferences, it is understood that the specific order or hierarchy in the processes/flows may be rearranged. Further, some steps may be combined or omitted. The accompanying method claims present elements of the various flows in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method for obfuscating sources of internet-based content for rendering a webpage, the method comprising:
    receiving, by an obfuscation server, a request from a web browser at a user device for content for rendering a webpage;
    based on receiving the request, retrieving, by the obfuscation server, internet-based data from at least one server hosting the webpage, wherein the internet-based data comprises a plurality of source identifiers indicative of a plurality of servers hosting the content for rendering the webpage, wherein the plurality of source identifiers comprises at least a first source identifier indicative of a first server and a second source identifier indicative of a second server distinct from the first server;
    obfuscating, by the obfuscation server, each of the plurality of source identifiers for the plurality of servers hosting the content to generate obfuscated internet-based data, wherein obfuscating the plurality of source identifiers comprises altering at least the first source identifier to be indicative of the second server; and
    transmitting at least the obfuscated internet-based data to the web browser by the obfuscation server, wherein the web browser renders the webpage based, in part, on the obfuscated internet-based data.

2. The method of claim 1, wherein said retrieving internet-based data from at least one server hosting the webpage based on a request received from a web browser at an end user device comprises retrieving, by the obfuscation server, first internet-based data from the at least one server based on a first request from the web browser, the first internet-based data comprising a first plurality of source identifiers.

3. The method of claim 2, further comprises:
    obfuscating, by the obfuscation server, the first plurality of source identifiers to generate a first obfuscated internet-based data; and
    retrieving, by the obfuscation server, second internet-based data from the at least one server based on a second request from the web browser, wherein the second request is based on the obfuscated internet-based data.

4. The method of claim 3, further comprises translating, by the obfuscation server, the second request into the first plurality of source identifiers.

5. The method of claim 3, further comprises:
    obfuscating, by the obfuscation server, source identifiers of the retrieved second internet-based data; and
    transmitting the retrieved second internet-based data and obfuscated source identifiers to the web browser, wherein the web browser renders the webpage based on the second internet-based data and obfuscated source identifiers.

6. The method of claim 5, wherein the first internet-based data comprises the webpage, the second request comprises a GET list generated by the web browser based on the obfuscated webpage, and the second internet-based data comprises one or more pieces of content.

7. The method of claim 6, wherein the webpage is a file provided in HyperText markup language (HTML) and comprises content for rendering the webpage.

8. The method of claim 1, wherein obfuscating the at least one source identifier comprises altering at least the at least one source identifier to not be indicative of the server hosting the content for rending the webpage.

9. The method of claim 1, further comprising:
    receiving, by the obfuscation server, a plurality of client-side scripts for performing functionality of the webpage;
    obfuscating, by the obfuscation server, the plurality of client-side scripts into a plurality of obfuscated client-side scripts;
    transmitting, by the obfuscation server, the plurality of obfuscated client-side scripts to the user device; and storing the plurality of obfuscated client-side scripts and the plurality of client-side scripts in a memory of the obfuscation sever.

10. The method of claim 9, further comprising:
receiving, by the obfuscation server, an input from the user device to execute a client-side script, the input comprising an obfuscated client-side script of the plurality of obfuscated client-side scripts;
translate the obfuscated client-side script of the received input to a corresponding client-side script stored in the memory; and
at least one of (i) execute the corresponding client-side script by the obfuscation sever, obfuscate results of the executed client-side script, and (ii) transmit the results to the user device; and transmit the corresponding client-side script to a downstream server for execution.

11. A system for obfuscating sources of internet-based content for rendering a webpage, the system comprising:
an obfuscation server;
at least one memory configured to store instructions; and
at least one processor communicatively coupled to the at least one memory and configured to execute the instructions to cause the obfuscation server to:
receive a request from a web browser at a user device for content for rendering a webpage;
based on receiving the request, retrieve internet-based data from at least one server hosting the webpage, wherein the internet-based data comprises a plurality of source identifiers indicative of a plurality of servers hosting the content for rendering the webpage, wherein the plurality of source identifiers comprises at least a first source identifier indicative of a first server and a second source identifier indicative of a second server distinct from the first server;
obfuscate each of the plurality of source identifiers for the plurality of servers hosting the content to generate obfuscated internet-based data, wherein obfuscating the plurality of source identifiers comprises altering at least the first source identifier to be indicative of the second server; and
transmit at least the obfuscated internet-based data to the web browser by the obfuscation server, wherein the web browser renders the webpage based, in part, on the obfuscated internet-based data.

12. The system of claim 11, wherein said retrieving internet-based data from at least one server hosting the webpage based on a request received from a web browser at an end user device comprises retrieving, by the obfuscation server, first internet-based data from the at least one server based on a first request from the web browser, the first internet-based data comprising a first plurality of source identifiers.

13. The system of claim 12, wherein the obfuscation server is further caused to:
obfuscate the first plurality of source identifiers to generate a first obfuscated internet-based data; and
retrieve second internet-based data from the at least one server based on a second request from the web browser, wherein the second request is based on the obfuscated internet-based data.

14. The system of claim 13, further comprising a storage device communicatively coupled to the obfuscation server, the storage device configured to store the source identifiers and translation keys.

15. The system of claim 14, wherein the obfuscation server is further caused to translate the second request into the first plurality of source identifiers based on the translation keys.

16. The system of claim 13, wherein the obfuscation server is further caused to:
obfuscate source identifiers of the retrieved second internet-based data; and
transmit the retrieved second internet-based data and obfuscated source identifiers to the web browser, wherein the web browser renders the webpage based on the second internet-based data and obfuscated source identifiers.

17. The system of claim 16, wherein the first internet-based data comprises the webpage, the second request comprises a GET list generated by the web browser based on the obfuscated webpage, and the second internet-based data comprises one or more pieces of content.

18. An obfuscation server for obfuscating a webpage, the obfuscation server comprising:
a memory storing obfuscation and translation instructions; and
a processor coupled to the memory and configured to execute the instructions to:
receive a request from a web browser executed on an end user device for a webpage, the request based on an Internet Protocol (IP) addressed received from a Domain Name Service (DNS) server for a webpage hosted by a server;
retrieve a source file of the webpage from the server based on the received request, the source file comprising links to content for rendering the webpage, wherein the links comprise at least a first link indicative of a first server and a second link indicative of a second server distinct from the first server;
obfuscate, at least, the links included in the source file and generate an obfuscated source file comprising the obfuscated links, wherein obfuscating the links comprises altering at least the first link to be indicative of the second server; and
transmit the obfuscated source file to the web browser.

19. The obfuscation server of claim 18, wherein the processor is further configured to:
receive a GET list from the web browser comprising one or more obfuscated links;
retrieve, from the server, content corresponding to the one or more of the obfuscated links included in the GET lists, the content comprising a filename and content data;
obfuscate at least one of the filename and the content data of the retrieved content; and
transmit the obfuscated content to the web browser,
wherein the web browser renders the webpage based, in part, on the obfuscated content as though the content was received directly from the server.

* * * * *